United States Patent
Ito et al.

(10) Patent No.: US 7,487,289 B2
(45) Date of Patent: Feb. 3, 2009

(54) APPARATUS AND METHOD FOR DETECTING DISK WRITE OMISSIONS

(75) Inventors: Mikio Ito, Kawasaki (JP); Hideo Takahashi, Kawasaki (JP); Shinya Mochizuki, Kawasaki (JP); Hidejiro Daikokuya, Kawasaki (JP); Kazuhiko Ikeuchi, Kawasaki (JP); Hideki Yamanaka, Kawasaki (JP); Katsuhiko Nagashima, Kawasaki (JP); Akihito Kobayashi, Kawasaki (JP); Koji Uchida, Kawasaki (JP); Shinichi Nishizono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 380 days.

(21) Appl. No.: 11/348,320

(22) Filed: Feb. 7, 2006

(65) Prior Publication Data

US 2006/0179217 A1    Aug. 10, 2006

Related U.S. Application Data

(63) Continuation-in-part of application No. 11/131,416, filed on May 18, 2005, now abandoned.

(30) Foreign Application Priority Data

Feb. 8, 2005  (JP) .............................. 2005-031232
Nov. 18, 2005 (JP) .............................. 2005-333719

(51) Int. Cl.
*G06F 12/06* (2006.01)
*G06F 11/08* (2006.01)
*G06F 11/18* (2006.01)

(52) U.S. Cl. ............................ 711/112; 711/114; 714/5
(58) Field of Classification Search ....................... None
See application file for complete search history.

(56) References Cited

U.S. PATENT DOCUMENTS

2002/0161972 A1 * 10/2002 Talagala et al. ............. 711/114
2006/0075287 A1 *  4/2006 Vageline et al. ................ 714/5

FOREIGN PATENT DOCUMENTS

JP           10-171608         6/1998

OTHER PUBLICATIONS

U.S. Appl. No. 11/131,416, filed May 18, 2005, Shinya Mochizuki, et al., Fujitsu Limited.

* cited by examiner

*Primary Examiner*—Hyung S Sough
*Assistant Examiner*—Duc T Doan
(74) *Attorney, Agent, or Firm*—Staas & Halsey LLP

(57) ABSTRACT

In the present invention, for each set of blocks [#(0) to #(N–1)] storing update data, a history block [#(N)] storing an update state value, for example, a generation, time or check code, showing an update state is provided, constituting a set of management data as a check object. When writing update data on a disk, a new update state value is calculated for the same set of management data and stored in memory as update state confirmation value. The new update state value is also set as write data in the history block in the same set of management data, and the entire of the set of management data including update data and update state value are written onto a disk. The history block is read and disk write omissions are detected by comparing the update state value and the update state confirmation value stored in memory.

3 Claims, 38 Drawing Sheets

| UPDATE DATA (0) | BCC | Block#(0) |
|---|---|---|
| ⋮ | ⋮ | |
| UPDATE DATA (N−1) | BCC | Block#(N−1) |
| UPDATE STATE VALUE | BCC | Block#(N) |

FIG. 19

| DATA 512BYTES | BCC 8BYTES |
|---|---|

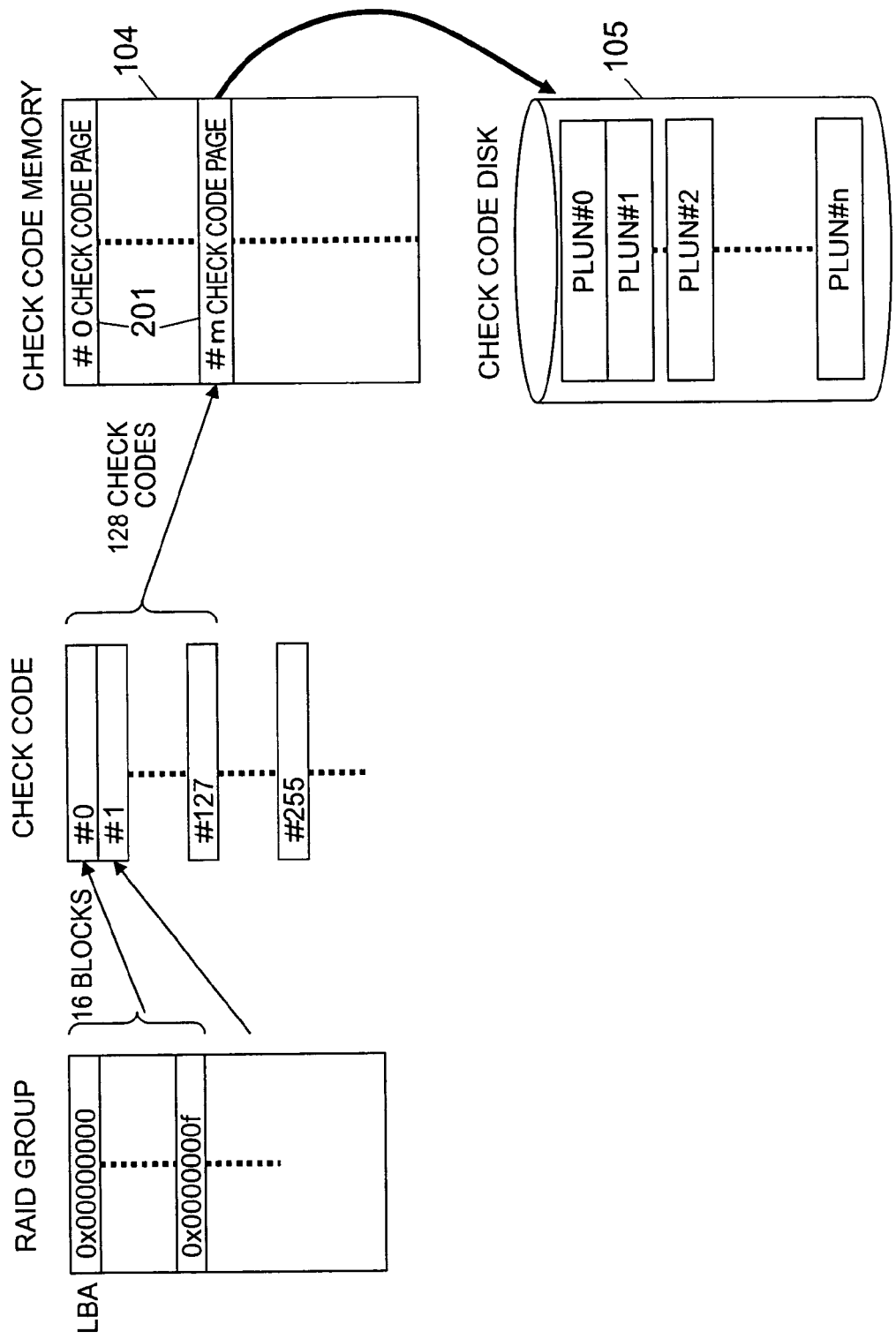

FIG. 26

| OFFSET | Byte0 | Byte1 | Byte2 | Byte3 |
|---|---|---|---|---|
| 0x00 | Dirty Bitmap(16Byte) | | | |
| 0x10 | LUN LBA (8Byte) | | | |
| 0x18 | LUN | | Reserve | Keep Flag |
| 0x1C | keep Status | | reserve | |
| 0x20 | Present Bitmap(16 Byte) | | | |
| 0x30 | LRU Next 16BE ID | | | |
| 0x34 | LRU Previous 16BE ID | | | |
| 0x38 | LUN Next 16BE ID | | | |
| 0x3C | LUN Previous 16BE ID | | | |
| 0x40 | Hash Group Next 16BE ID | | | |
| 0x44 | Hash Group Previous 16BE ID | | | |
| 0x48 | Hash Synonym Next 16BE ID | | | |
| 0x4C | Hash Synonym Previous 16BE ID | | | |
| 0x50 | Hash Entry Number | | | |
| 0x54 | reserve | Link List | Reserve | |
| 0x58 | reserve | | | |
| 0x5C | reserve | | | |
| 0x60 | Mirror 16BETable Pointer | | | |
| 0x64 | reserve | | | |
| 0x68 | 16CC Buffer Address(8 Byte) | | | |
| 0x70 | Mirror 16CC Buffer Address(8 Byte) | | | |

APPARATUS AND METHOD FOR DETECTING DISK WRITE OMISSIONS

CROSS-REFERENCE TO RELATED APPLICATIONS

This is a continuation-in-part application of U.S. patent application Ser. No. 11/131,416, filed on May 18, 2005, now abandoned. This application also claims the conventional priority based on Japanese patent application serial No. 2005-031232, filed on Feb. 8, 2005 and Japanese patent application serial No. 2005-333719, filed on Nov. 18, 2005, the both disclosures of which are incorporated herein by reference.

BACKGROUND OF THE INVENTION

1. Field of the Invention

The present invention relates to technology that checks data that was written on a disk, and more particularly to an apparatus and method for detecting disk write omissions that accurately detect write omissions on a disk.

2. Description of the Related Art

Conventionally, when checking data to ensure that the data is written on a disk (or a magnetic disk), a check code is established for each block that is an I/O (Input/Output) unit to the disk, and this check code is used to ensure that the data is written accurately.

Figure 19:
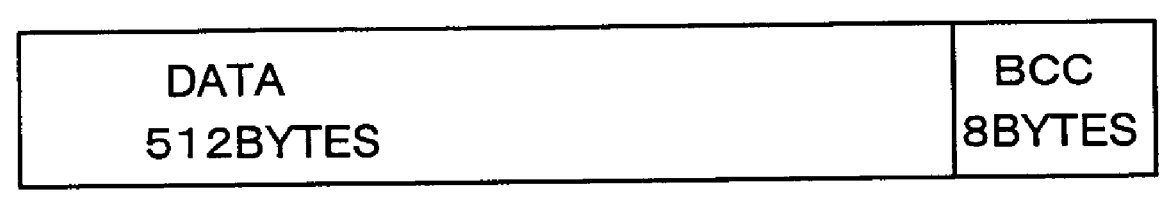

FIG. 19 illustrates an example of the format of one block. In the format example shown in FIG. 19, 8 bytes containing a BCC (Block Check Code) as a check code to detect errors is added to data of 512 bytes, to form 1 block of 520 bytes.

In this connection, Japanese Patent Laid-Open No. 10-171608 discloses a magnetic disc array and a data checking method used in a magnetic disc array.

When updating data on a disk in accordance with a data write request from a host computer, in some cases an area for which writing was requested is not actually updated.

Here, the term "disk write omission" refers to a case in which updating was not actually performed for a particular area and the old data remains as it was in that area even though the disk returns a reply to the effect that the area for which writing was requested was updated with the new data in response to a data write request from the host computer.

When a disk write omission occurs in one part of one block, for example, as in a case in which the first 4 bytes of the 512 bytes of data within the one block shown in FIG. 19 was not updated, the relation between the BCC and the data breaks down. Accordingly, in this case, a disk write omission can be detected by the conventional technology that conducts a data check using the BCC.

However, when a disk write omission occurs for the entire area of the one block the old data will remain in the entire area of the one block of FIG. 19. In this case, the relation between the BCC and the data is maintained as the old one block. Accordingly, there is a problem that this disk write omission cannot be detected by the conventional technology that conducts a data check using the BCC.

The write omission on a disk also raises a problem, for example, when upon reception of a data write request from a host computer, a disk control system stores update data in a cache memory within a system on a temporary basis, and then writes back the update data in the cache memory on the disk. It is necessary to examine whether a write omission on a disk occurred before update data in the cache memory is written back on the disk.

Further, the write omission on a disk also raises a problem, for example, when the disk control system stages data in the disk on a cache memory. It is also necessary to examine whether a write omission on a disk occurred to check the correctness of staging of data when data in the disk is staged on the cache memory.

Further, an object of the technology disclosed in the Japanese Patent Laid-Open No. 10-171608 is to detect in which data read from which address of which magnetic disk unit among a plurality of magnetic disk units an error exists, and it does not attempt to accurately detect a disk write omission that occurred in the entire area of one block.

SUMMARY OF THE INVENTION

It is an object of the present invention to provide an apparatus and method for detecting disk write omissions that solve the aforementioned problem of the prior art by enabling accurate detection of disk write omissions, even when a disk write omission occurred in the entire area of one block.

It is another object of the present invention to check whether a write omission on a disk occurred, for example, before update data in a cache memory is written back to the disk.

It is still another object of the present invention to check whether a write omission on a disk occurred, for example, when data in the disk is staged on a cache memory.

The present invention provides an apparatus for detecting write omissions on a disk which stores electronic data as an object for processing in a computer. The apparatus comprises an update state setting unit relating a history block to a set of blocks, the history block being set an update state value indicating an update state, the set of blocks being set an update data as an object of reading and writing by the computer, making a set of management data to be an object of an update state check from the set of blocks and the history block, generating a new update state value which is different to an update state value before updating when writing the update data on the disk, storing the new update state value in a memory as an update state confirmation value, and writing the set of management data containing the update data and the new update state value on the disk, and an update state checking unit comparing the update state value in the set of management data read from the disk with the update state confirmation value which is stored in the memory, and detecting that a disk write omission occurred when the update state value and the update state confirmation value do not match.

Preferably, in the aforementioned apparatus for detecting disk write omissions, the update state value comprises an update generation number, an update time, a check code which is uniquely generated from the update data of the set of blocks, or a combination thereof.

According to the present invention, disk write omissions can be accurately detected even when a disk write omission occurred in the entire area of the set of management data.

The present invention also provides an apparatus for detecting write omissions on a disk which stores electronic data as an object for processing in a computer. The apparatus comprises an update state setting unit relating a history block to a set of blocks, the history block being set an update state value indicating an update state, the set of blocks being set an update data as an object of reading and writing by the computer, making a set of management data to be an object of an update state check from the set of blocks and the history block, calculating a first update state value that is defined according to the update data in the set of management data when writing the update data on the disk, writing the set of management data including the update data and the first update state value on the disk, and an update state checking unit calculating a second update state value defined according to the update data in the set of management data read from the disk, setting the second update state value as an update state confirmation value, comparing the first update state value in the set of management data read from the disk with the update state confirmation value, and detecting that a disk write omission occurred when the first update value and the update state confirmation value do not match.

The present invention detects a disk write omission by comparing an update state value read from a disk with an update state confirmation value that was calculated from data read from the disk. Thus, according to the present invention, it is possible to detect a disk write omission even without previously storing an update state confirmation value in an apparatus for detecting disk write omissions.

The present invention further provides an apparatus for detecting write omissions on a plurality of disks which store electronic data as an object for processing in a computer. The apparatus comprises an update state setting unit relating a history block to a set of blocks, the history block being set an update state value indicating an update state, the set of blocks being set an update data as an object of reading and writing by the computer, making a set of management data to be an object of an update state check from the set of blocks and the history block, generating a new update state value which is different to an update state value before updating when writing the update data on the plurality of disks, and writing the set of management data containing the update data and the new update state value on the plurality of disks redundantly, and an update state checking unit comparing the update state values in the set of management data which are read from each of the plurality of disks, and detecting that a disk write omission occurred when the update state values do not match each other.

The present invention detects disk write omissions by comparing update state values read from a plurality of disks, respectively. Thus, according to the present invention, a disk write omission that occurred in the entire area of the set of management data can be detected even without previously storing an update state confirmation value in the apparatus for detecting disk write omissions.

Preferably, in the present invention, the update state setting unit further comprises a data merging unit which reads, when a block which is not an object of updating is present between the history block and the blocks containing update data whose contents are changed in the current operation in the set of management data, data of the block which is not an object of updating from the disk and merges the read data with the data of the blocks containing the update data.

According to the present invention, writing to a disk of blocks in which update data is set and a block in which an update state value is set can be conducted in one write process.

The present invention further provides an apparatus for detecting write omissions on a disk which stores electronic data as an object for processing in a computer. The apparatus comprises a cache memory storing update data as an object of reading and writing by the computer, a check code generating unit making a plurality of blocks as a set of management data for an object for detection of a write omission on a disk, the update data being set to the plurality of blocks, generating a first check code for each set of management data including a data of write-back request area when writing back the update data stored in the cache memory on the disk, and storing the generated first check code in a storage unit, and a disk write omission detecting unit reading the set of management data including a data of staging request area from the disk when staging data on the cache memory from the disk, storing data of the staging request area of the read set of management data, in the cache memory, generating a second check code from data of the staging request area stored in the cache memory and data other than the data of the staging request area of the read set of management data, comparing the generated second check code with the first check code stored in the storage unit and corresponding to the set of management data including the data of staging request area, and detecting that a write omission on a disk occurred when the first and second check codes do not match.

According to the present invention, whether a write omission on a disk occurred can be checked when data in a disk is staged on a cache memory.

Preferably, in the aforementioned apparatus for detecting write omissions on a disk, the disk write omission detecting unit reads the set of management data including the data of write-back request area from the disk when writing back the update data on a disk, generates a third check code from the read set of management data, and compares the generated third check code with the first check code stored in the storage unit and corresponding to the set of management data including the data of write-back request area, and when the third check code and the first check code match as a result of the comparison by the disk write omission detecting unit, the check code generating unit generates a new first check code from the update data of the write-back request area and a data other than the data of the write-back request area, of the set of management unit read by the disk write omission detecting unit, and stores the generated new first check code in the storage unit as the first check code corresponding to the set of management data including the data of write-back request area.

According to the present invention, whether a write omission on a disk occurred can be checked before update data in a cache memory is written back on the disk.

Preferably, in the aforementioned apparatus for detecting write omissions on a disk, the check code generating unit generates a check code for parity data corresponding to the set of management data including the data of write-back request area when writing back the update data on the disk, and stores the check code in the storage unit as the first check code, and the disk write omission detecting unit reads the parity data corresponding to the set of management data including the data of write-back request area from the disk when writing back the update data on the disk, generates a fourth check code from the read parity data, compares the generated fourth check code with the first check code stored in the storage unit and generated for the parity data corresponding to the set of management data including the data of write-back request area, and detects that a write omission on a disk occurred when the first and fourth check codes do not match.

The present invention provides a method for detecting write omissions on a disk which stores electronic data as an object for processing in a computer. The method comprises relating a history block to a set of blocks, the history block being set an update state value indicating an update state, the set of blocks being set an update data as an object of reading and writing by the computer, making a set of management data to be an object of an update state check from the set of blocks and the history block, generating a new update state value which is different to an update state value before updating when writing the update data on the disk, storing the new update state value in a memory as an update state confirmation value, writing the set of management data containing the update data and the new update state value on the disk, comparing the update state value in the set of management data read from the disk with the update state confirmation value which is stored in the memory, and detecting that a disk write omission occurred when the update state value and the update state confirmation value do not match.

Preferably, in the aforementioned method for detecting disk write omissions, the update state value comprises an update generation number, an update time, a check code which is uniquely generated from the update data of the set of blocks, or a combination thereof.

The present invention also provides a method for detecting write omissions on a disk which stores electronic data as an object for processing in a computer. The method comprises relating a history block to a set of blocks, the history block being set an update state value indicating an update state, the set of blocks being set an update data as an object of reading and writing by the computer, making a set of management data to be an object of an update state check from the set of blocks and the history block, calculating a first update state value that is defined according to the update data in the set of management data when writing the update data on the disk, writing the set of management data including the update data and the first update state value on the disk, calculating a second update state value defined according to the update data in the set of management data read from the disk, setting the second update state value as an update state confirmation value, comparing the first update state value in the set of management data read from the disk with the update state confirmation value, and detecting that a disk write omission occurred when the first update value and the update state confirmation value do not match.

The present invention further provides a method for detecting write omissions on a plurality of disks which store electronic data as an object for processing in a computer. The method comprises relating a history block to a set of blocks, the history block being set an update state value indicating an update state, the set of blocks being set an update data as an object of reading and writing by the computer, making a set of management data to be an object of an update state check from the set of blocks and the history block, generating a new update state value which is different to an update state value before updating when writing the update data on the plurality of disks, writing the set of management data containing the update data and the new update state value on the plurality of disks redundantly, comparing the update state values in the set of management data which are read from each of the plurality of disks, and detecting that a disk write omission occurred when the update state values do not match each other.

Preferably, the aforementioned method for detecting disk write omissions further comprises, when a block which is not an object of updating is present between the history block and the blocks containing update data whose contents are changed in the current operation in the set of management data, reading data of the block which is not an object of updating from the disk and merging the read data with the data of the blocks containing the update data.

According to the present invention, a disk write omission can be accurately detected even when a disk write omission occurred in the entire area of the set of management data.

Further, according to the present invention, whether a write omission on a disk occurred can be checked before update data in a cache memory is written back on the disk.

Further, according to the present invention, whether a write omission on a disk occurred can be checked when data in the disk is staged on a cache memory.

BRIEF DESCRIPTION OF THE DRAWINGS

FIG. 19 is a diagram showing an example of the format of one block.

FIG. 25 is a diagram explaining an example of a relation between a logical volume defined for a RAID group, and the check code and the check code memory.

FIG. 26 is a diagram showing an example of a format of a check code page management table.

DETAILED DESCRIPTION OF THE PREFERRED EMBODIMENTS

In the present invention, to a set of blocks for setting update data, one history block in which to set an update state value indicating the update state of the set of blocks is related. A set of management data that is the object of an update state check is made from the set of blocks for setting update data and the history block for setting an update state value.

When writing update data on a disk, a new update state value is generated that is different to the update state value before the updating, and that new update state value is stored in a memory as an update state confirmation value. The update state confirmation value is data that is compared with the update state value when checking the update state.

The set of blocks in which update data was set and the one block in which the new update state value was set are then written together on the disk as the set of management data.

After writing the set of management data on the disk, an update state check is carried out. More specifically, the update state value in the set of management data is read from the disk and compared with the update state confirmation value recorded in the memory. When the update state confirmation value and the update state value do not match, it is judged that a disk write omission occurred.

As examples of the timing of the update state check, an extension of writing to the disk, an asynchronous patrol to the disk, a time of reading from the disk in accordance with a request of the host computer and the like may be mentioned.

According to the present invention, in addition to blocks in which update data is set, one block is allocated for an update state value to be written to the disk. This is because processing efficiency and storage efficiency are poor if all update data relating to a write request from the host computer is retained on the memory as an update state confirmation value as well as being retained on the disk as an update state value.

According to the present invention, in order to efficiently store an update state confirmation value and an update state value, one update state confirmation value and one update state value is set for a set of blocks in which update data is set.

The unit of the set of blocks in which update data is set may be, for example, a host I/O processing unit or a strip that conducts consecutive I/O to one disk in a RAID device.

Figures 1A, 1B:
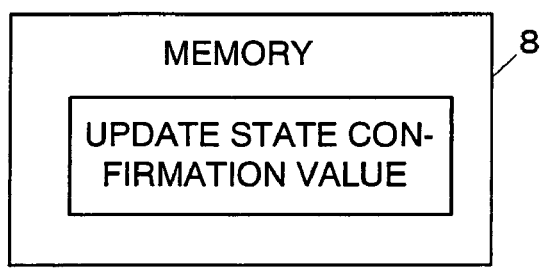
FIG. 1A is a diagram showing an update state confirmation value.
FIG. 1B is a diagram showing an update data and an update state value.

FIG. 1A is a diagram showing an update state confirmation value that is set on a memory. FIG. 1B is a diagram showing update data and update state values that are written on a disk.

In FIG. 1B, the N blocks from block #(0) to block #(N−1) are blocks in which update data is set. Block #(N) is a block in which an update state value to be written on a disk is set.

In the present invention, as shown in FIG. 1A, an update state confirmation value is set on a memory 8. In the block #(N) shown in FIG. 1B, the update state confirmation value on the memory 8 is set as an update state value, and added to the blocks from block #(0) to #(N−1) in which update data was set.

The N+1 blocks from block #(0) to block #(N) are then written on a disk as a set of management data.

After writing the set of management data on the disk, the update state value is read from the disk and the read update state value is compared with the update state confirmation value that was set on the memory 8.

When the update state value and the update state confirmation value match, it is determined that the update data was written normally on the disk. When the update state value and the update state confirmation value do not match, it is determined that a disk write omission occurred.

In this connection, in the present invention, the method for detecting a write omission on a disk is not limited to the method described above. For example, in embodiment 7 of the present invention described later, a plurality of blocks (for example, 16 blocks (8 KB)) to which update data is set are used as a set of management data for an object for detection of a write omission on a disk, a check code is generated for each set of management data including a data of write-back request area when the update data stored in a cache memory is written back on the disk, and the generated check code is stored in a storage unit.

As described later, in embodiment 7, the set of management data including a data of staging request area is read from the disk when data is staged on the cache memory from the disk, data of the staging request area of the read set of management data, is stored in the cache memory, a check code is generated from data of the staging request area stored in the cache memory and data other than the data of the staging request area of the read set of management data, the generated check code is compared with the check code stored in the storage unit and corresponding to the set of management data including the data of staging request area, and it is detected that a write omission on a disk occurred when the former and latter check codes do not match.

Figure 2:
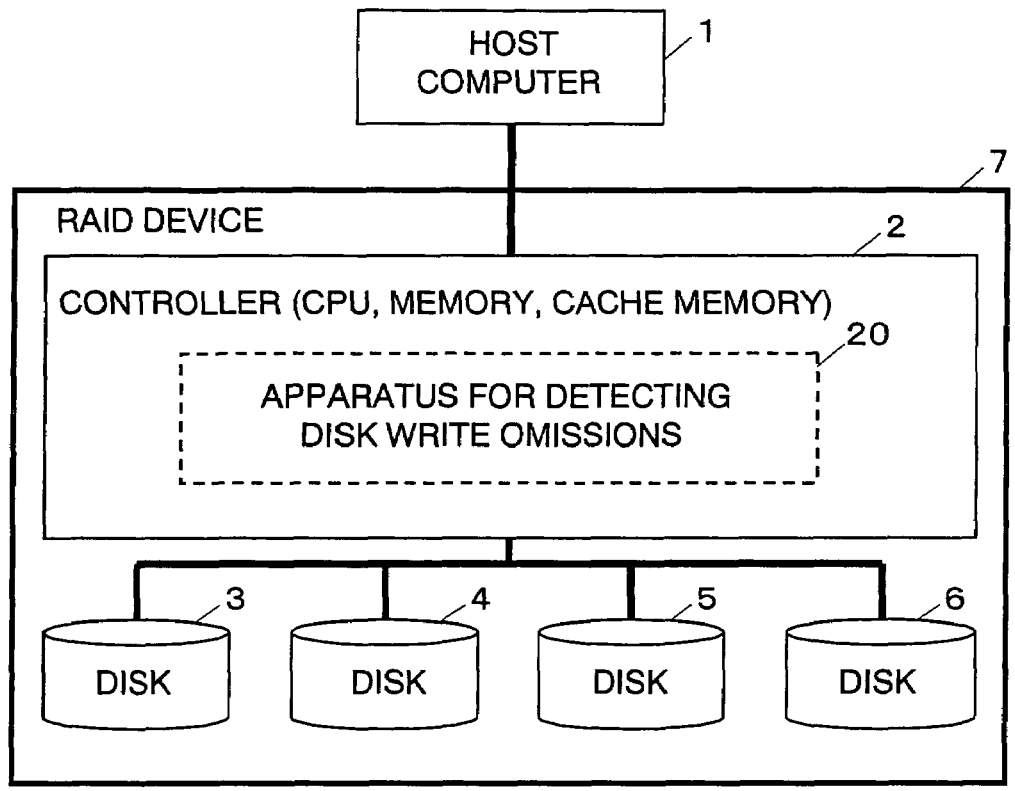
FIG. 2 is a diagram showing one example of a system configuration diagram of the present invention.

FIG. 2 is a diagram showing one example of a system configuration diagram of the present invention. In FIG. 2, reference numeral 1 denotes a host computer, reference numeral 2 denotes a controller, reference numerals 3 to 6 denote disks, and reference numeral 20 denotes an apparatus for detecting disk write omissions. The controller 2 writes or reads data to or from each disk in accordance with a write request or a read request from the host computer 1. The controller 2 is implemented by hardware such as a CPU (Central Processing Unit), a memory, and a cache memory.

The apparatus for detecting disk write omissions 20 detects disk write omissions. In this system, the apparatus for detecting disk write omissions 20 is implemented by the controller 2. In addition to a function to detect disk write omissions, the apparatus for detecting disk write omissions 20 has the same disk control functions as a conventional apparatus, and comprises a RAID device 7 that redundantly writes update data on each disk.

The host computer 1 issues requests to read or write data from or to the disks 3 to 6 to the apparatus for detecting disk write omissions 20. After writing update data on the disks 3 to 6, the apparatus for detecting disk write omissions 20 checks that the update data was written normally.

Figure 3:
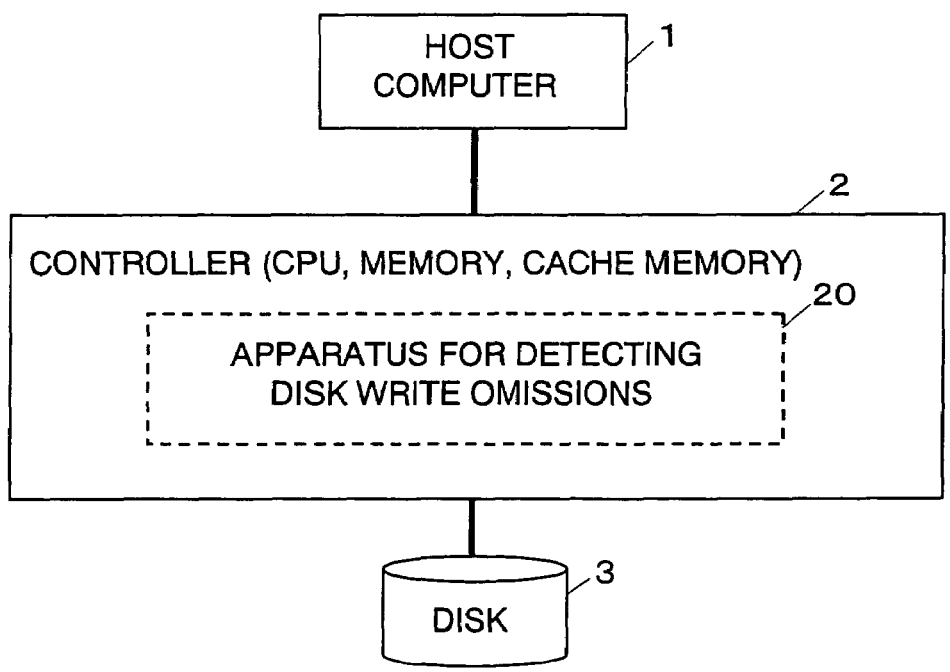
FIG. 3 is a diagram showing another example of a system configuration of the present invention.

FIG. 3 is a diagram showing another example of the system configuration of the present invention. In the system shown in FIG. 3, the apparatus for detecting disk write omissions 20 does not comprise a RAID (Redundant Arrays of Inexpensive Disks) device and is implemented as a controller 2 that writes update data to a single disk 3.

Both the system configuration shown in FIG. 2 and the system configuration shown in FIG. 3 can be employed for the present invention.

Figure 4:
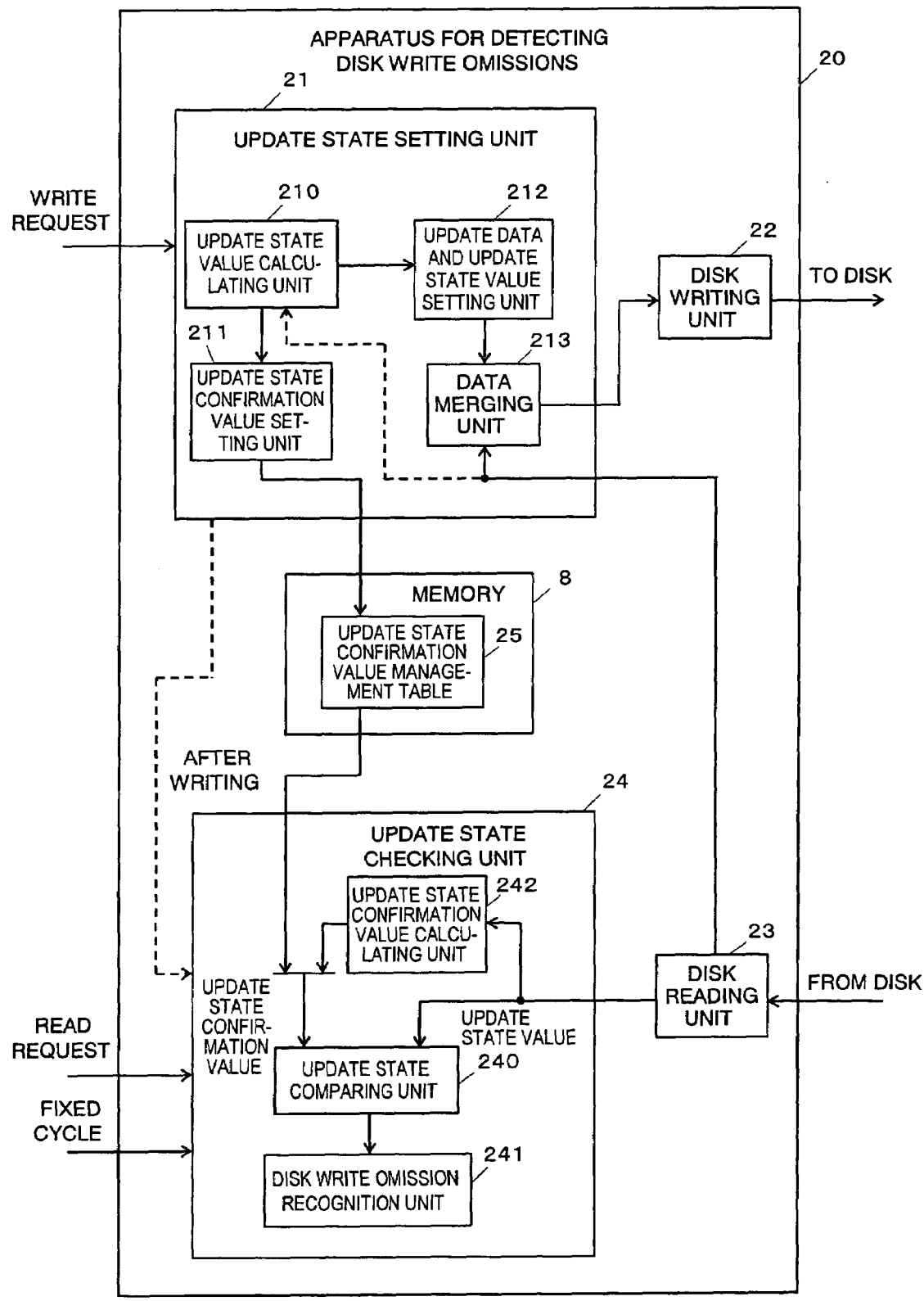
FIG. 4 is a diagram showing one example of a finctional block diagram of the apparatus for detecting disk write omissions.

FIG. 4 is a diagram showing one example of a functional block diagram of the apparatus for detecting disk write omissions. The apparatus for detecting disk write omissions 20 comprises an update state setting unit 21, a disk writing unit 22, a disk reading unit 23, an update state checking unit 24, and a memory 8.

The update state setting unit 21 receives write requests from the host computer and sets update data and an update state value in a set of management data that is written onto a disk. The update state setting unit 21 also stores an update state confirmation value in a memory 8.

The disk writing unit 22 writes update data and an update state value that were set in the set of management data by the update state setting unit 21 onto a disk. The disk reading unit 23 reads data that was written on a disk.

After the set of management data is written onto a disk, the update state checking unit 24 compares the update state confirmation value with the update state value that was read from the disk to thereby detect a disk write omission.

The timing at which processing to detect a disk write omission is carried out is, for example, the time directly after an operation to write onto the disk, the time of a read request from the host computer 1 or a timing of a fixed cycle or the like.

The memory 8 comprises an update state confirmation value management table 25 in which update state confirmation values are stored. The structure of data in the update state confirmation value management table 25 is described later.

The update state setting unit 21 comprises an update state value calculating unit 210, an update state confirmation value setting unit 211, an update data and update state value setting unit 212 and a data merging unit 213. The update state value calculating unit 210 calculates update state values that are set in the set of management data. The update state confirmation value setting unit 211 stores the calculated update state values in the update state confirmation value management table 25 as update state confirmation values.

The update data and update state value setting unit 212 sets update data in the set of management data inside a buffer memory and also sets update state values that were calculated by the update state value calculating unit 210 in the set of management data. The data merging unit 213 merges data of blocks containing update data with data of blocks that are not objects of updating that were read from a disk.

The update state checking unit 24 comprises an update state comparing unit 240, a disk write omission recognition unit 241, and an update state confirmation value calculating unit 242. The update state comparing unit 240 compares an update state value read from a disk with an update state confirmation value that was stored in the update state confirmation value management table 25, or compares an update state value read from a disk with an update state confirmation value that was calculated by the update state confirmation value calculating unit 242.

The disk write omission recognition unit 241 recognizes whether or not a disk write omission occurred based on a comparison result produced by the update state comparing unit 240. The update state confirmation value calculating unit 242 calculates an update state confirmation value based on data read from a disk.

In this connection, when the apparatus for detecting disk write omissions 20 comprises a RAID device and redundantly writes the set of management data in which update data and update state values were set onto a plurality of disks, the update state comparing unit 240 compares the update state values that were respectively read from the plurality of disks. In this case, processing by the update state confirmation value setting unit 211 to store update state confirmation values in the update state confirmation value management table 25 is not required.

Figure 5:
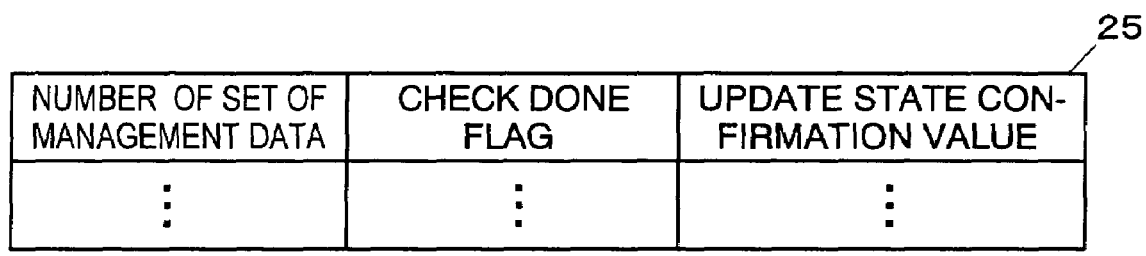
FIG. 5 is a diagram showing one example of the data configuration of an update state confirmation value management table.

FIG. 5 is a diagram showing one example of the configuration of data of an update state confirmation value management table. The update state confirmation value management table 25 is composed of a region in which a number of each set of management data are set, a region in which a check done flag is set, and a region in which an update state confirmation value is set. A number of a set of management data is a number that uniquely identifies the set of management data. A check done flag is a flag that shows whether or not the update state checking unit 24 has checked an update state value of the set of management data that was written on a disk. The check done flag is not required when the update state checking unit 24 checks the update state value of the set of management data each time the set of management data is written.

In this connection, according to the present invention, the update state confirmation value management table 25 is not required in a case in which, before a process to write the set of management data on a disk, an update state value is read from the disk and the read update state value is then incremented and employed as an update state confirmation value.

Embodiments of the present invention are described hereunder. In an embodiment 1 to an embodiment 5 below, the apparatus for detecting disk write omissions 20 is configured to write a set of management data on one disk. In an embodiment 6, the apparatus for detecting disk write omissions 20 comprises a RAID device and is configured to redundantly write a set of management data on a plurality of disks. The configuration of embodiment 7 will be described later.

Hereunder, the embodiment 1 of the present invention is described. In the embodiment 1, update generation numbers that indicate the update generation of data are used as update state values and update state confirmation values. Each time a set of management data of N+1 blocks is written to a disk an update generation number is incremented by the update state setting unit 21.

The update state checking unit 24 compares an update state confirmation value that was stored in the update state confirmation value management table 25 with an update state value that was read from a disk, and if the values do not match the update state checking unit 24 determines that a disk write omission occurred.

Figure 6:
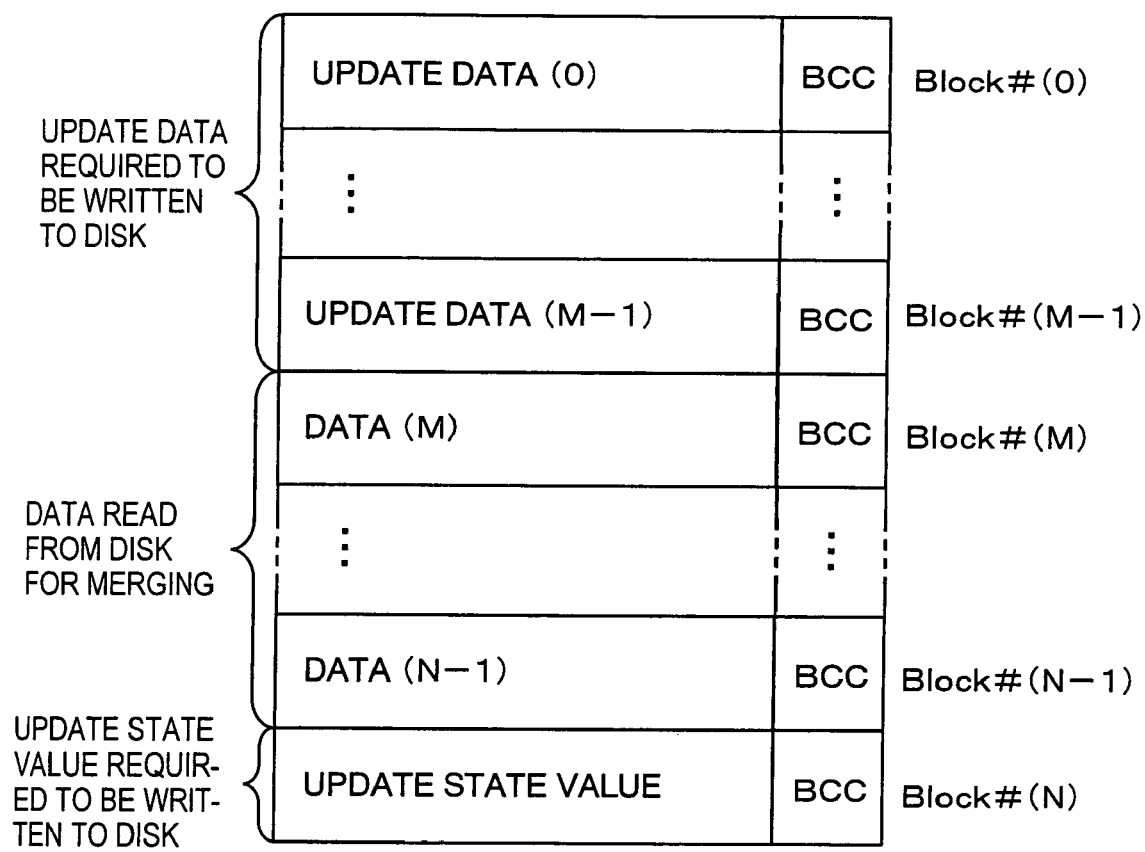
FIG. 6 is a diagram illustrating the updating of data of blocks of one portion of N blocks.

Here, as shown in FIG. 6, it is assumed, for example, that of the N blocks from Block# (0) to Block# (N−1), the update data to be written to the disk is in the M blocks from Block# (0) in which update data (0) is set to Block# (M−1) in which update data (M−1) is set. Further, the blocks from Block# (M) to Block# (N−1) are blocks in which data (M) to data (N−1) are set as data that is not an object of updating.

Thus, in a case in which blocks in which update data is set constitute one portion of N blocks, the blocks in which update data is set are separated from a block (Block #(N)) in which an update state value is set. Since it is considered that a disk write omission occurs in one write operation, it is necessary that writing onto the disk of the blocks in which update data is set and the block in which the update state value is set be carried out in one write operation.

Therefore, in the embodiment 1, the disk reading unit 23 reads from the disk the blocks from Block# (M) to Block# (N−1) that are not an object of updating. Then, the data merging unit 213 of the update state setting unit 21 merges the data of the blocks containing update data with the data of the blocks that are not an object of updating that were read from the disk. The update data and update state value setting unit 212 sets the blocks from Block# (0) to Block# (N) after merge processing by the data merging unit 213 in a set of management data to be written onto the disk.

Figure 7:
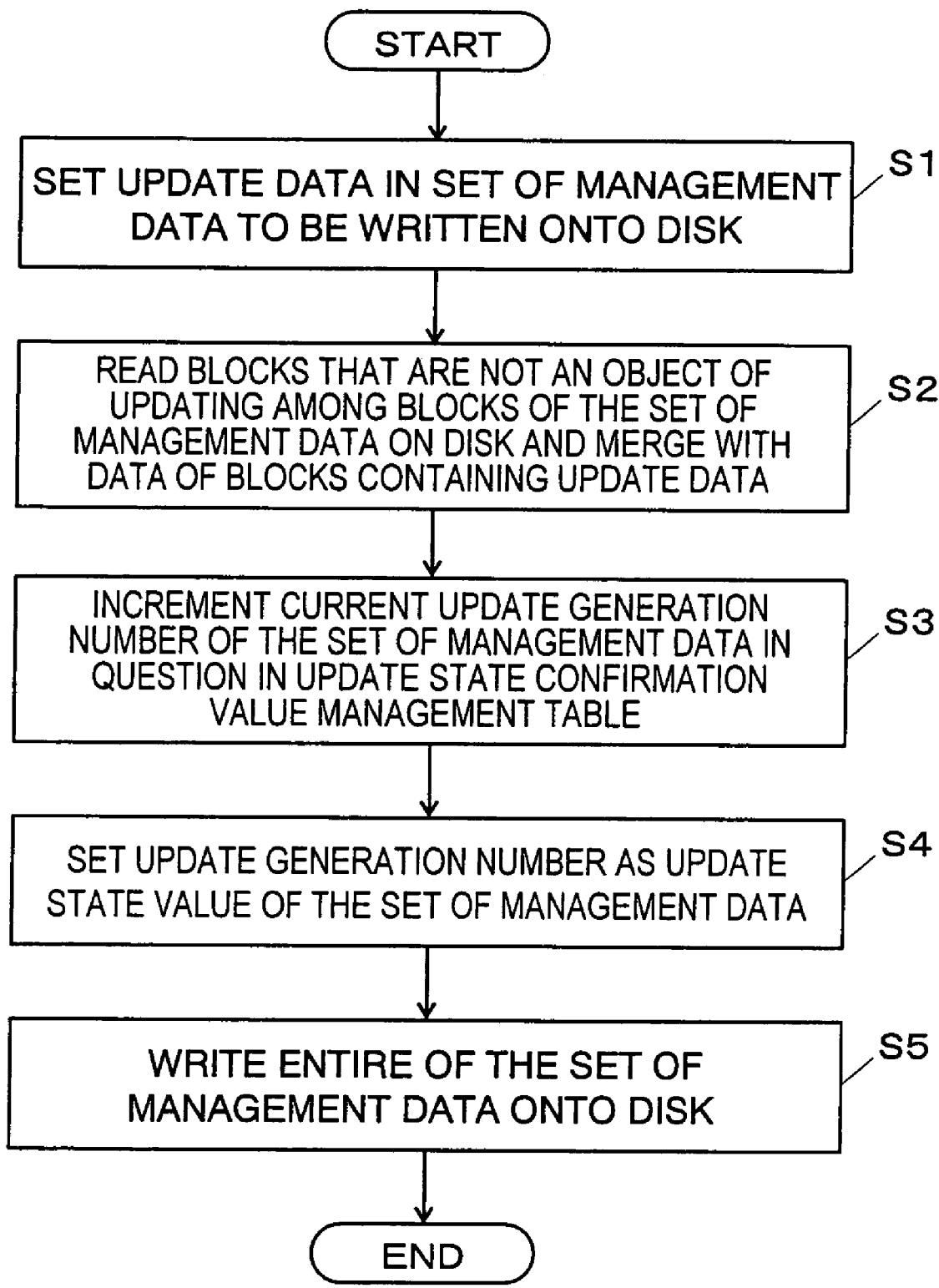
FIG. 7 is a diagram showing an example of the flow of a write process.

FIG. 7 shows one example of the flow of a write process in the embodiment 1. First, the update data and update state value setting unit 212 sets update data in a set of management data to be written onto a disk (step S1).

Next, the disk reading unit 23 reads blocks that are not an object of updating among the blocks of the set of management data on the disk and merges these blocks with the data of the blocks containing the update data (step S2).

The update state confirmation value setting unit 211 then increments the current update generation number of the set of management data in question in the update state confirmation value management table 25 (step S3). The update data and update state value setting unit 212 sets the update generation number as the update state value of the set of management data (step S4). Then, the disk writing unit 22 writes the entire of the set of management data onto the disk (step S5).

Figure 8:
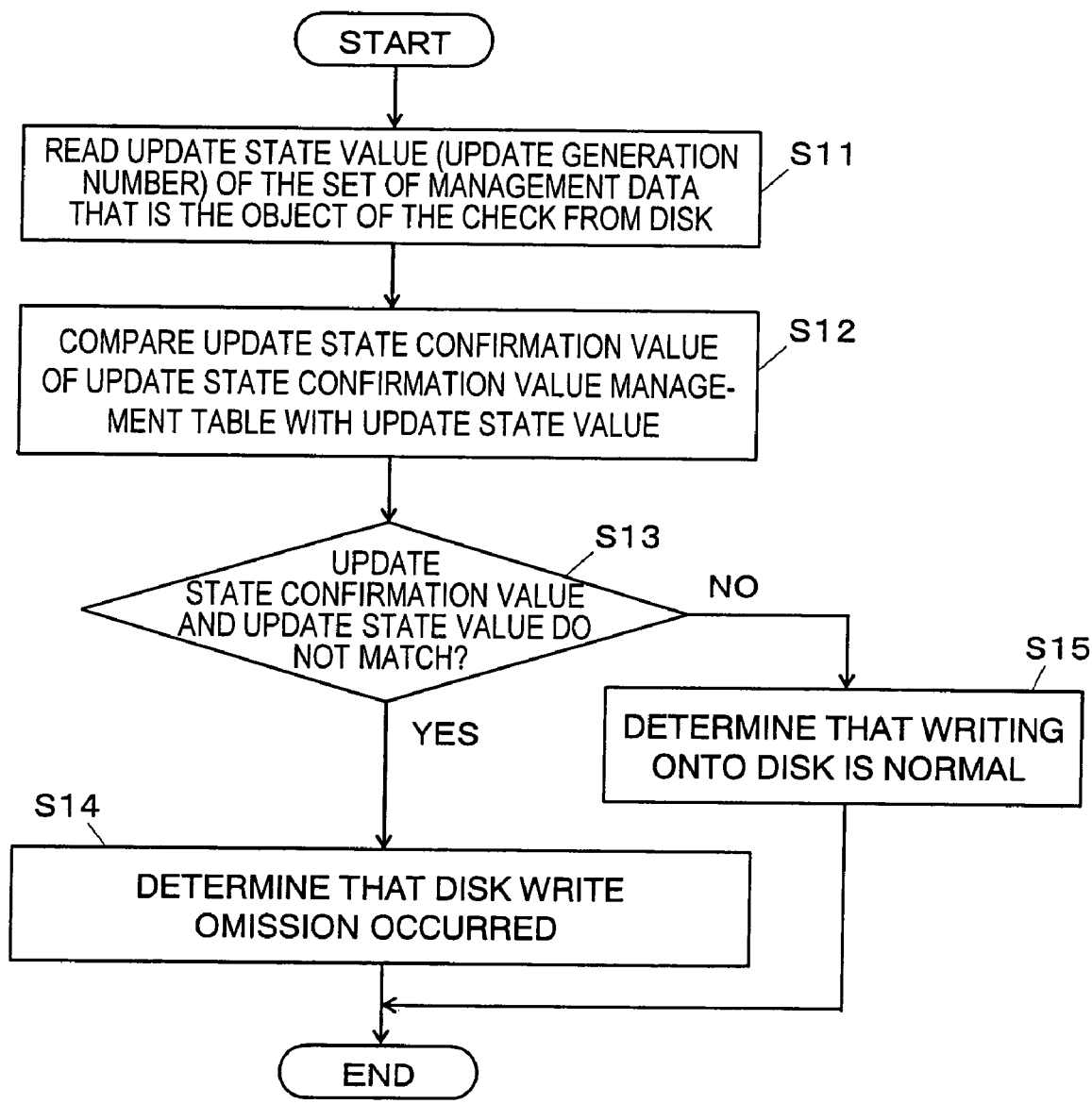
FIG. 8 is a diagram showing an example of the flow of an update state check process.

FIG. 8 is a diagram showing one example of the flow of an update state check process in the embodiment 1. First, the disk reading unit 23 reads the update state value (update generation number) of the set of management data that is the object of the check from the disk (step S11). Then, the update state comparing unit 240 of the update state checking unit 24 compares the update state confirmation value of the update state confirmation value management table 25 with the update state value (step S12). When the update state confirmation value and the update state value do not match (step S13), the disk write omission recognition unit 241 determines that a disk write omission occurred (step S14). When the update state confirmation value and the update state value match, the disk write omission recognition unit 241 determines that the writing onto the disk is normal (step S15).

Hereunder, an embodiment 2 of the present invention is described. The difference between the embodiment 2 and the embodiment 1 is that in the embodiment 2 the time of updating data is used as the update state value and the update state confirmation value.

For the embodiment 2, it is necessary to deal with cases in which a plurality of operations to write to a disk is performed at the same time. Therefore, in this case, for example, an update state check is performed prior to write operations performed at the same time and scheduling is carried out so that write operations are not carried out to the same region at the same time.

Figure 9:
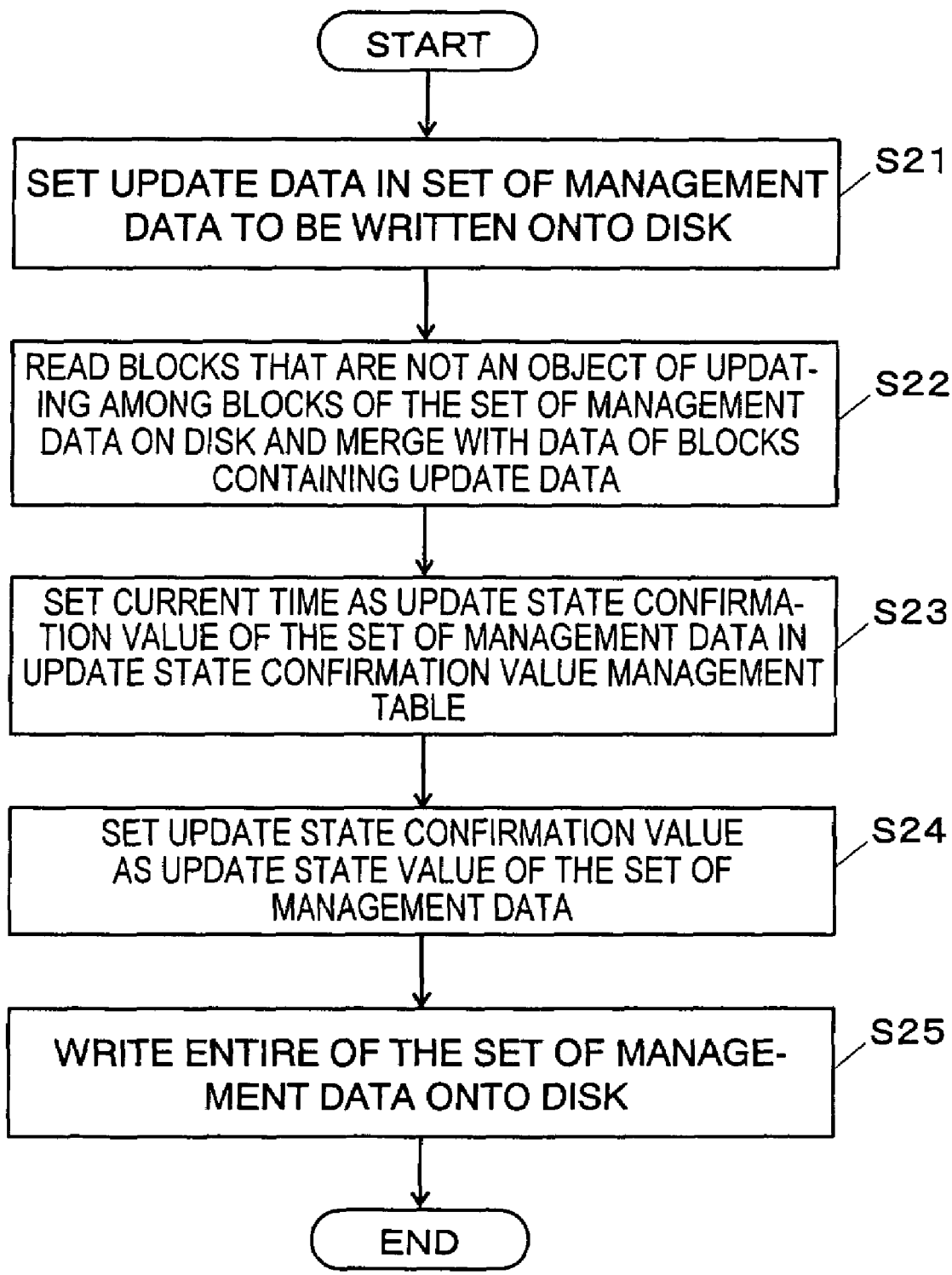
FIG. 9 is a diagram showing an example of the flow of a write process.

FIG. 9 is a diagram showing an example of the flow of a write process in the embodiment 2. First, the update data and update state value setting unit 212 sets update data in a set of management data to be written onto a disk (step S21).

Next, the disk reading unit 23 reads the blocks that are not an object of updating among the blocks of the set of management data on the disk and merges these blocks with the data of the blocks containing update data (step S22).

The update state confirmation value setting unit 211 then sets the current time as the update state confirmation value of the set of management data in the update state confirmation value management table 25 (step S23). The update data and update state value setting unit 212 sets the update state confirmation value as the update state value of the set of management data (step S24). Then, the disk writing unit 22 writes the entire of the set of management data onto the disk (step S25).

Figure 10:
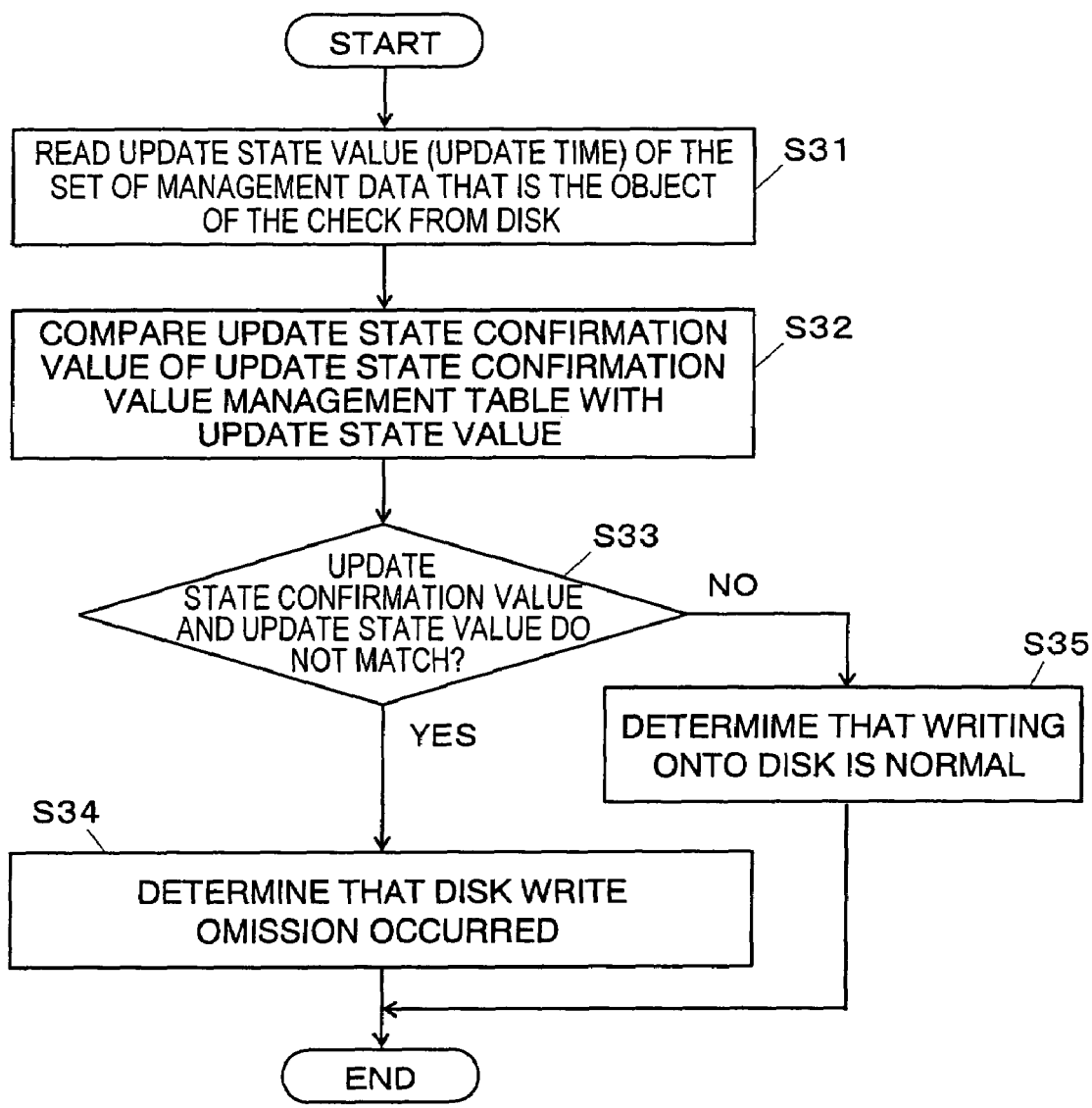
FIG. 10 is a diagram showing an example of the flow of an update state check process.

FIG. 10 is a diagram showing an example of the flow of an update state check process in the embodiment 2. First, the disk reading unit 23 reads the update state value (update time) of the set of management data that is the object of the check from the disk (step S31). Then, the update state comparing unit 240 of the update state checking unit 24 compares the update state confirmation value of the update state confirmation value management table 25 with the update state value (step S32). When the update state confirmation value and the update state value do not match (step S33), the disk write omission recognition unit 241 determines that a disk write omission occurred (step S34). When the update state confirmation value and the update state value match, the disk write omission recognition unit 241 determines that the writing onto the disk is normal (step S35).

Hereunder, an embodiment 3 of the present invention is described. In the embodiment 3, the update state value calculating unit 210 of the update state setting unit 21 carries out calculation processing using CRC or XOR (exclusive disjunction) for a data part (blocks in which update data and merged data not an object of updating are assigned) of a set of management data to generate a check code.

The update state confirmation value setting unit 211 sets the generated check code in the update state confirmation value management table 25 as the update state confirmation value, and the update data and update state value setting unit 212 sets the check code as the update state value of the set of management data.

The disk writing unit 22 writes update data and the update state value onto a disk, then the disk reading unit 23 reads the update state value from the disk.

The update state comparing unit 240 of the update state checking unit 24 compares the read update state value with the update state confirmation value in the update state confirmation value management table 25. If the update state value and the update state confirmation value do not match, the disk write omission recognition unit 241 determines that a disk write omission occurred.

Figure 11:
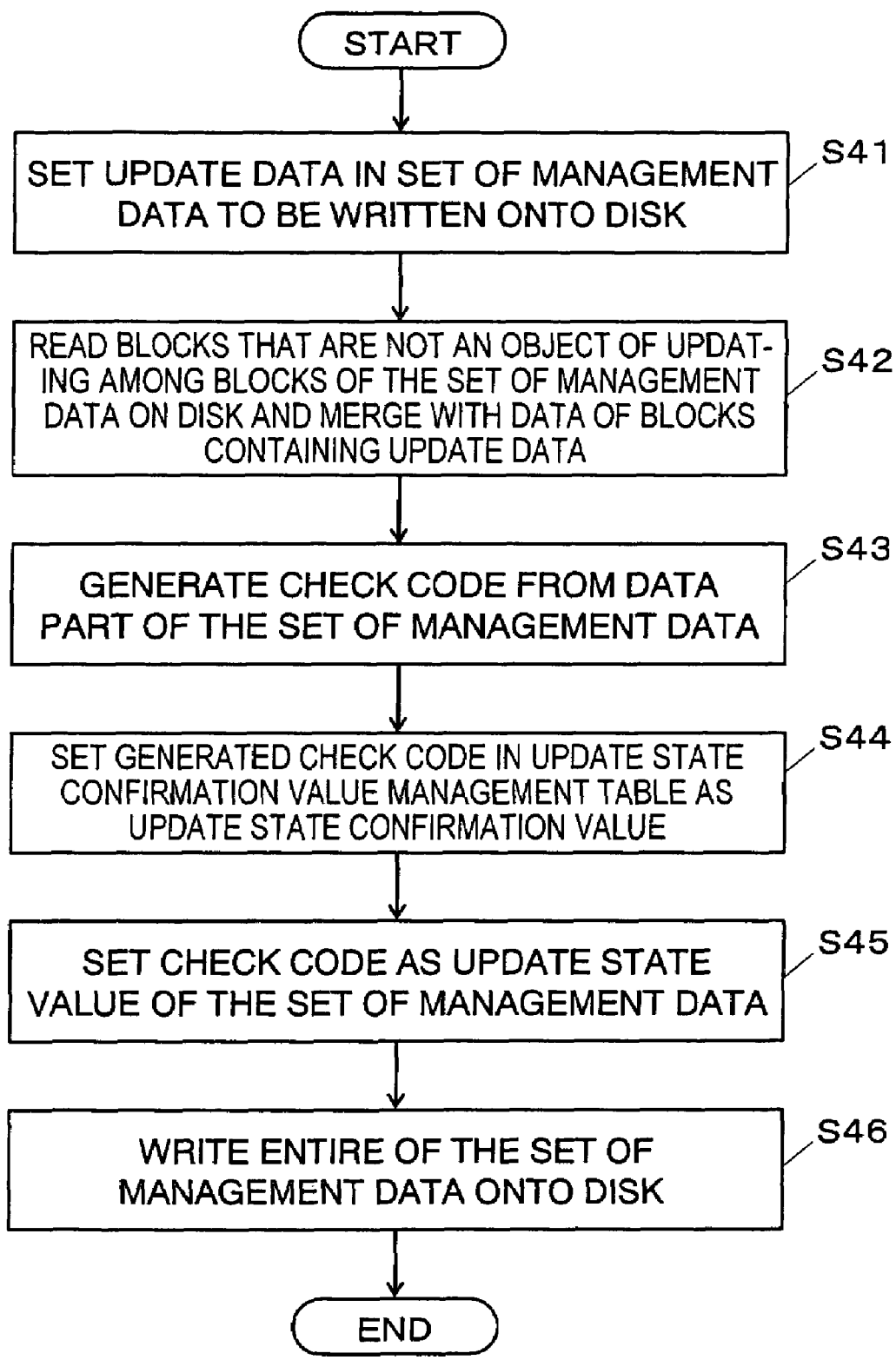
FIG. 11 is a diagram showing an example of the flow of a write process.

FIG. 11 shows one example of the flow of a write process in the embodiment 3. First, the update data and update state value setting unit 212 sets update data in a set of management data to be written onto a disk (step S41).

Next, the disk reading unit 23 reads the blocks that are not an object of updating among the blocks of the set of management data on the disk and merges these blocks with the data of blocks containing the update data (step S42).

The update state value calculating unit 210 generates a check code from the data part of the set of management data (step S43). Then, the update state confirmation value setting unit 211 sets the generated check code in the update state confirmation value management table 25 as an update state confirmation value (step S44).

Next, the update data and update state value setting unit 212 sets the check code as the update state value of the set of management data (step S45). Then, the disk writing unit 22 writes the entire of the set of management data onto the disk (step S46).

Figure 12:
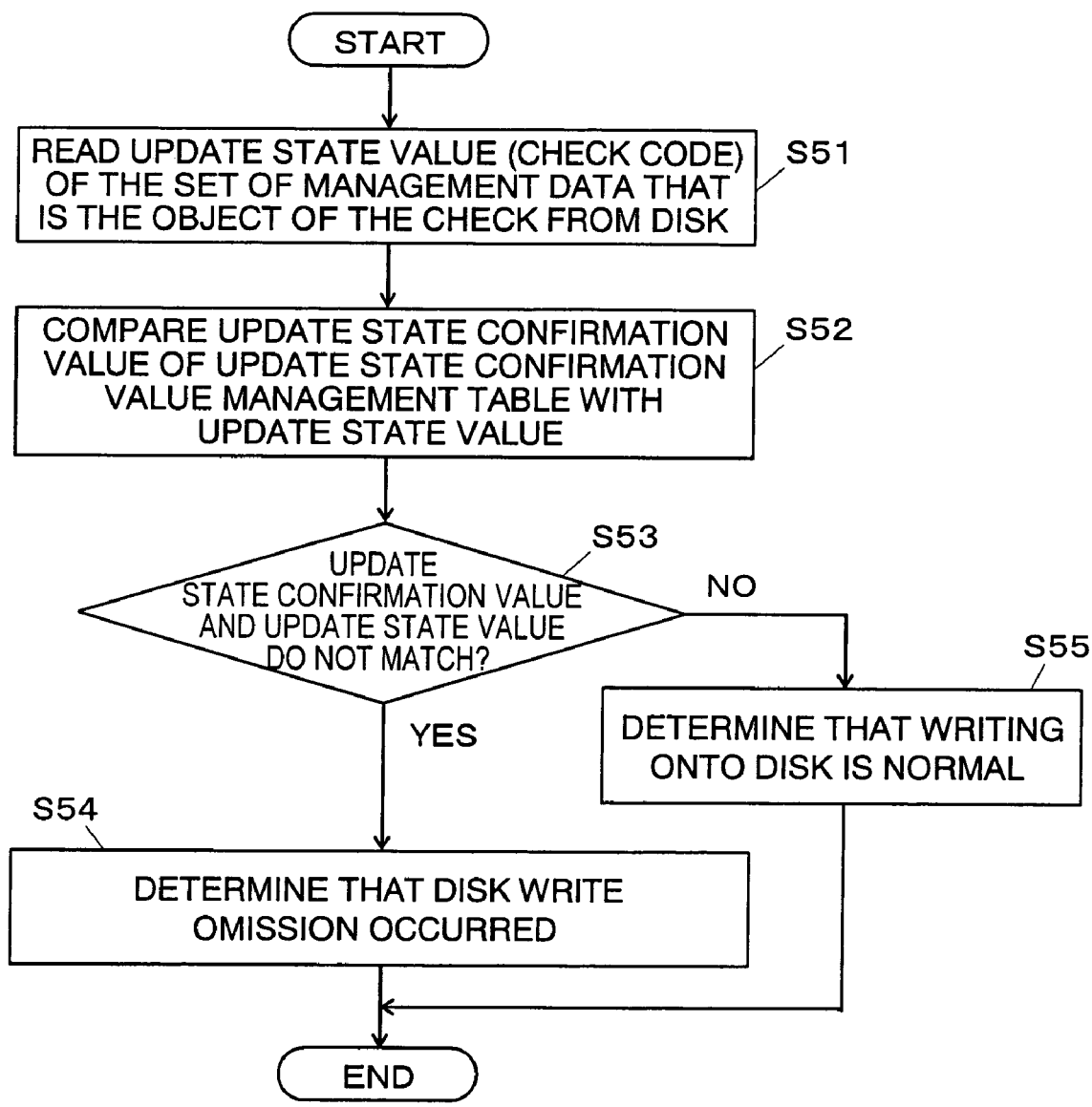
FIG. 12 is a diagram showing an example of the flow of an update state check process.

FIG. 12 is a diagram showing an example of the flow of an update state check process in the embodiment 3. First, the disk reading unit 23 reads the update state value (check code) of the set of management data that is the object of the check from the disk (step S51). Then, the update state comparing unit 240 of the update state checking unit 24 compares the update state confirmation value of the update state confirmation value management table 25 with the update state value (step S52). When the update state confirmation value and the update state value do not match (step S53), the disk write omission recognition unit 241 determines that a disk write omission occurred (step S54). When the update state confirmation value and the update state value match, the disk write omission recognition unit 241 determines that the writing onto the disk is normal (step S55).

Hereunder, an embodiment 4 of the present invention is described. In the embodiment 4, the update state value calculating unit 210 of the update state setting unit 21 implements processing using CRC or XOR (exclusive disjunction) for a data part (blocks in which update data and merged data that is not an object of updating are assigned) of a set of management data to generate a check code.

The update data and update state value setting unit 212 then sets the generated check code as the update state value of the set of management data.

After the set of management data is written onto a disk, the disk reading unit 23 reads the update data and the update state value of the set of management data from the disk. The update state confirmation value calculating unit 242 of the update state checking unit 24 carries out calculation processing using CRC or XOR (exclusive disjunction) for the update data that was read, and generates a check code to be used as the update state confirmation value.

The update state comparing unit 240 then compares the update state value that was read and the generated check code. If the update state value and the check code do not match, the disk write omission recognition unit 241 determines that a disk write omission occurred.

In the embodiment 4, a check for disk write omissions is conducted on the basis of the result of comparing an update state value read from a disk with a check code generated using update data read from the disk. Accordingly, unlike the embodiment 3, processing to set an update state confirmation value in the update state confirmation value management table 25 can be omitted.

In the embodiment 4, when blocks in which update data is set comprise one portion of N blocks, similarly to the embodiment 1, a technique can be adopted that merges blocks containing data not an object to updating that were read from a disk with blocks containing update data.

Further, in the embodiment 4, even in a case in which blocks of update data comprise one portion of N blocks, as described below, for example, an XOR operation can be performed on the "update data" as well as the "existing data" corresponding to the update data and "existing update state value" to calculate a new update state value after updating.

Figure 13A:
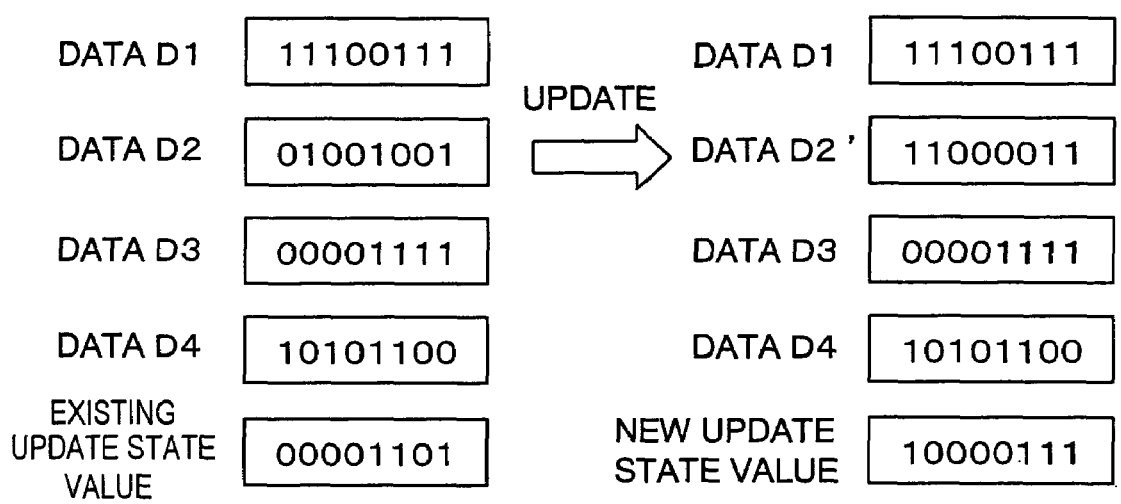
FIG. 13A and FIG. 13B are diagrams illustrating the calculation of a new update state value.

The figure on the left side of FIG. 13A shows an example of existing data and an existing update state value on a disk. The figure on the right side of FIG. 13A shows an example of data and a new update state value after updating. To facilitate ease of explanation in this example, each data and update state value is represented in 8 bits.

As shown in the figure on the left side of FIG. 13A, among the existing data from data D1 to data D4, for example, it is taken that the data D1 is "11100111", the data D2 is "01001001", the data D3 is "00001111" and the data D4 is "10101100".

The existing update state value "00001101" is the result obtained by executing an XOR operation on data units for the data D1 to data D4.

In this case, as shown in the figure on the right side of FIG. 13A, the data D2 is updated to data D2' "11000011". The new update state value "10000111" shown in the figure on the right side of FIG. 13A is the result obtained by performing an XOR operation on data units for the data D2' and the existing data (data D1, data D3, data D4).

Figure 13B:
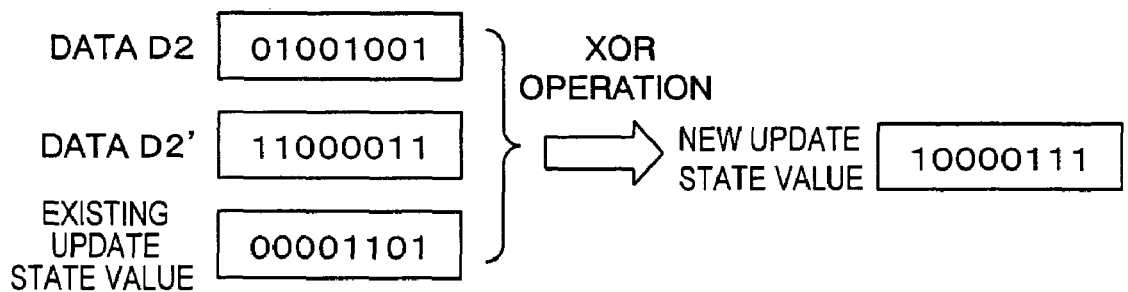

In the embodiment 4 of the present invention, a new update state value can be calculated without performing an XOR operation on all of the existing data and the update data. For example, as shown in FIG. 13B, by performing an XOR operation on data units for the data D2' "11000011" that is the update data as well as the data D2 "01001001" that is the existing data corresponding to the data D2' and the existing update state value "00001101", a new update state value "10000111" can be calculated that is the same as the result obtained by performing an XOR operation on all of data D1, D2', D3 and D4.

Figure 14:
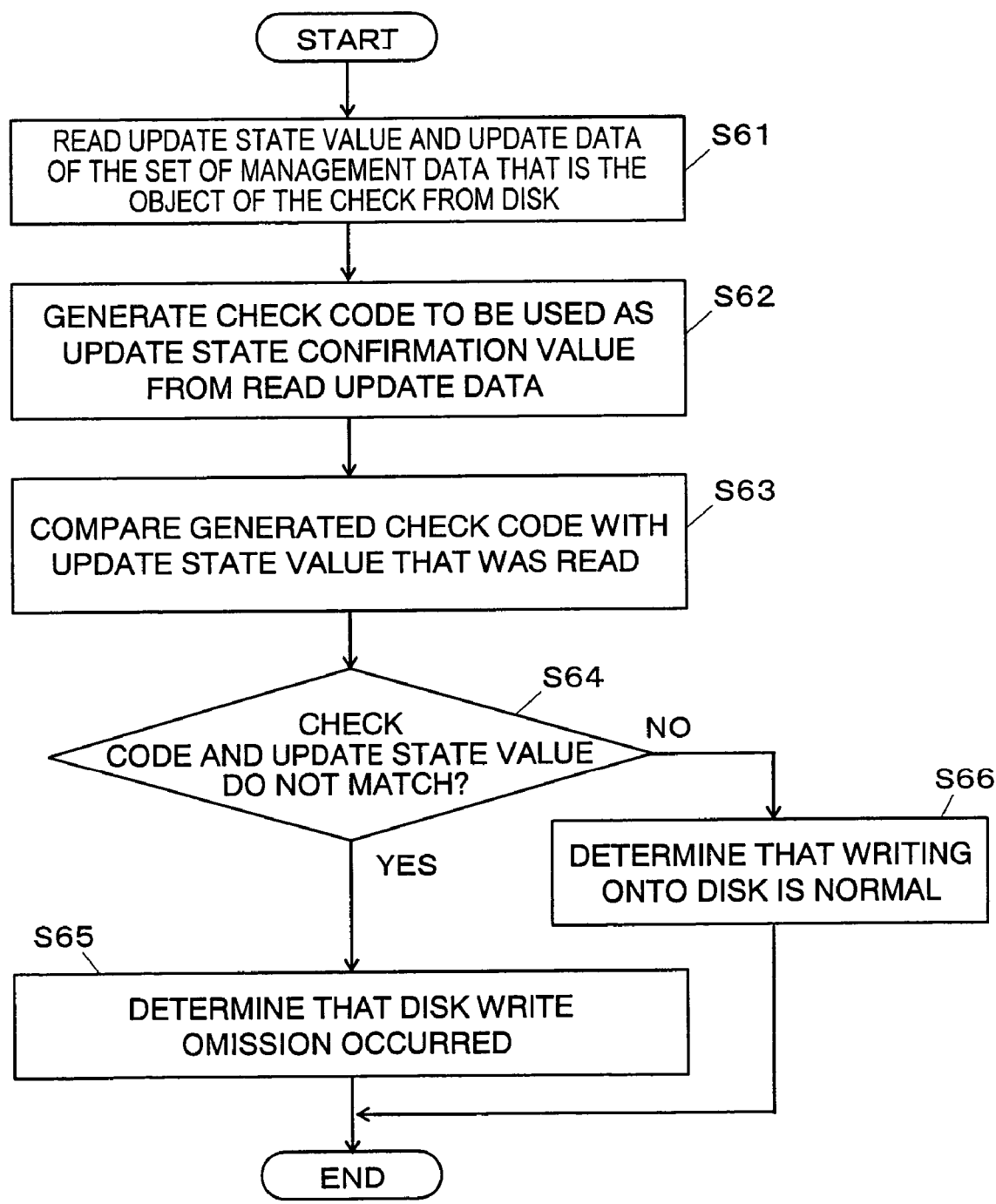
FIG. 14 is a diagram showing an example of the flow of an update state check process.

FIG. 14 is a diagram showing an example of the flow of an update state check process in the embodiment 4. First, the disk reading unit 23 reads the update state value and the update data of the set of management data that is the object of the check from the disk (step S61). The update state confirmation value calculating unit 242 of the update state checking unit 24 generates a check code to be used as the update state confirmation value from the read update data (step S62).

The update state comparing unit 240 then compares the generated check code with the update state value that was read (step S63). When the check code and the update state value do not match (step S64), the disk write omission recognition unit 241 determines that a disk write omission occurred (step S65). When the check code and the update state value match, the disk write omission recognition unit 241 determines that the writing onto the disk is normal (step S66).

Figure 15:
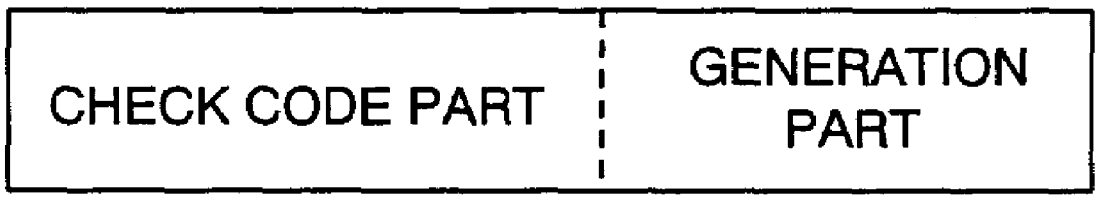
FIG. 15 is a diagram showing one example of the data configuration of an update state value and an update state confirmation value.

Hereunder, the embodiment 5 of the present invention is described. FIG. 15 is a diagram showing one example of the data configuration of an update state value and an update state confirmation value. As shown in FIG. 15, in the embodiment 5 an update state value and an update state confirmation value are composed of a check code part and a generation part. Of this update state confirmation value, the generation part is set in the update state confirmation value management table 25 and the check code part is generated from update data each time an update occurs.

In the embodiment 5, the update state value calculating unit 210 implements processing using CRC or XOR (exclusive disjunction) for a data part of a set of management data to generate a check code. The update state confirmation value setting unit 211 sets an update generation number in the generation part of an update state confirmation value of the update state confirmation value management table 25. In the embodiment 5, the time data is updated may be set in the generation part of the update state confirmation value in place of the update generation number.

As the update state value of the set of management data, the update data and update state value setting unit 212 sets the update generation number set in the generation part of the update state confirmation value in the generation part thereof, and sets the check code generated by the update state value calculating unit 210 in the check code part thereof, inside a buffer memory.

After writing the set of management data to a disk, the update state confirmation value calculating unit 242 generates a check code based on update data that was read from the disk.

The update state comparing unit 240 compares the check code part of the update state value that was read from the disk with the check code that was generated by the update state confirmation value calculating unit 242. When the check code part of the update state value and the check code that was generated by the update state confirmation value calculating unit 242 do not match, the disk write omission recognition unit 241 determines that a disk write omission occurred.

Further, the update state comparing unit 240 compares the generation part of the update state value that was read from the disk with the generation part of the update state confirmation value of the update state confirmation value management table 25. When the generation part of the update state value and the generation part of the update state confirmation value of the update state confirmation value management table 25 do not match, the disk write omission recognition unit 241 determines that a disk write omission occurred.

In the embodiment 5, a disk write omission is detected based on the result of comparing a check code part of an update state value that was read from a disk with a check code generated by the update state confirmation value calculating unit 242. Thus, according to the embodiment 5, a writing omission that occurred in one part of the set of management data can be detected.

Further, in the embodiment 5 a disk write omission is detected based on the result of comparing a generation part of an update state value that was read from a disk with a generation part of an update state confirmation value of the update state confirmation value management table 25. Thus, according to the embodiment 5, a writing omission that occurred in the entire area of the set of management data can also be detected.

Figure 16:
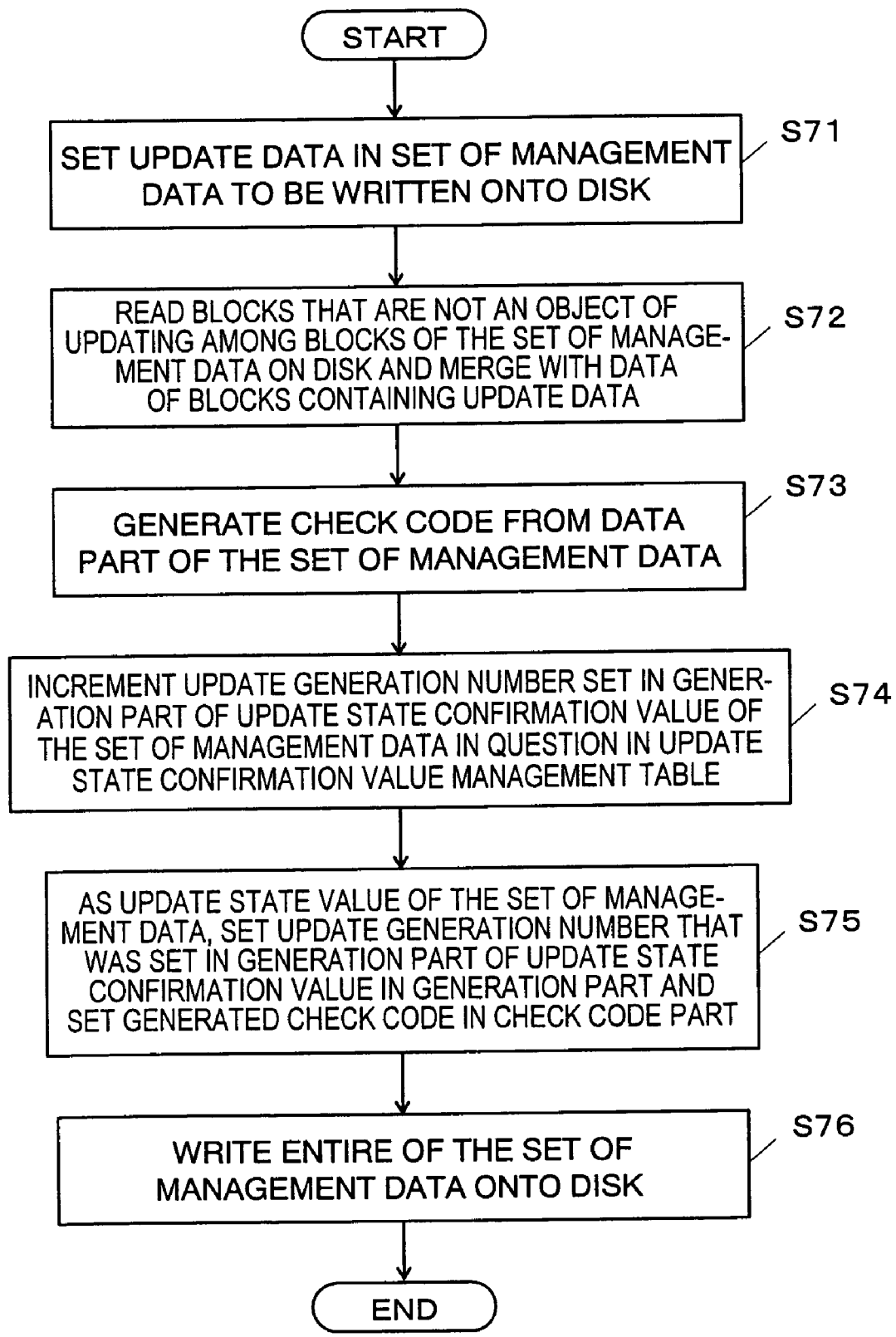
FIG. 16 is a diagram showing an example of the flow of a write process.

FIG. 16 is a diagram showing one example of the flow of a write process in the embodiment 5. First, the update data and update state value setting unit 212 sets update data in a set of management data to be written onto a disk (step S71).

Next, the disk reading unit 23 reads blocks that are not an object of updating among blocks of the set of management data on the disk and merges these blocks with the data of blocks containing update data (step S72).

The update state value calculating unit 210 then generates a check code from the data part of the set of management data (step S73).

Next, the update state confirmation value setting unit 211 increments the update generation number that was set in the generation part of the update state confirmation value of the set of management data in question in the update state confirmation value management table 25 (step S74). In this connection, in step S74, it is also possible to set the current time in the generation part of the update state confirmation value.

As the update state value of the set of management data, the update data and update state value setting unit 212 sets the update generation number that was set in the generation part of the update state confirmation value in the generation part thereof, and sets the generated check code in the check code part thereof (step S75). Then, the disk writing unit 22 writes the entire of the set of management data onto the disk (step S76).

Figure 17:
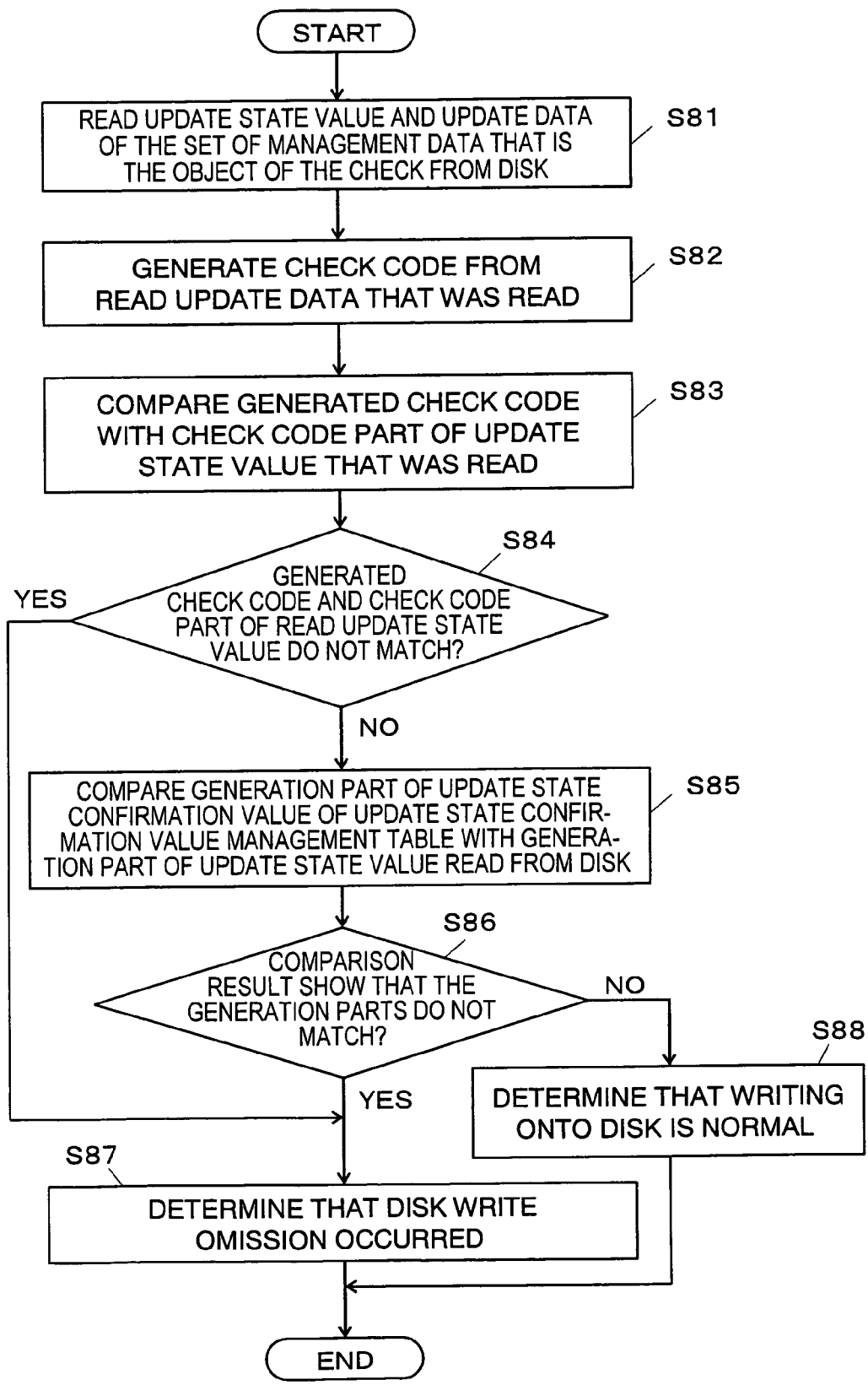
FIG. 17 is a diagram showing an example of the flow of an update state check process.

FIG. 17 is a diagram showing an example of the flow of an update state check process in the embodiment 5. First, the disk reading unit 23 reads the update state value and the update data of the set of management data that is the object of the check from the disk (step S81). Then, the update state confirmation value calculating unit 242 of the update state checking unit 24 generates a check code based on the update data that was read (step S82).

The update state comparing unit 240 compares the generated check code with the check code part of the update state value that was read (step S83). When the generated check code and the check code part of the update state value that was read do not match (step S84), the disk write omission recognition unit 241 determines that a disk write omission occurred (step S87).

When the generated check code matches the check code part of the update state value that was read, the update state comparing unit 240 compares the generation part of the update state confirmation value of the update state confirmation value management table 25 with the generation part of the update state value that was read from the disk (step S85). When the comparison result shows that the generation parts do not match (step S86), the disk write omission recognition unit 241 determines that a disk write omission occurred (step S87). When the comparison result shows that the generation parts match, the disk write omission recognition unit 241 determines that the writing onto the disk is normal (step S88).

Hereunder, the embodiment 6 of the present invention is described. In the embodiment 6, unlike the embodiment 1, the apparatus for detecting disk write omissions 20 comprises a RAID device and redundantly writes a set of management data on a plurality of disks.

In the case of RAID in which an update state value is written redundantly on a plurality of disks, the possibility of a writing omission occurring in a similar manner at the same time on a plurality of disks is low, irrespective of mirror/parity.

Therefore, in the embodiment 6 the update state comparing unit 240 compares update state values, more specifically, update generation numbers, that are read from a plurality of disks, respectively. When the update generation numbers that are read respectively from the plurality of disks are the same, the disk write omission recognition unit 241 determines that writing was conducted normally on the plurality of disks. When the update generation numbers that are read respectively from the plurality of disks differ, the disk write omission recognition unit 241 determines that a disk write omission occurred on the disk in which the update generation number is that of an old generation.

In the embodiment 6, since disk write omissions are detected based on the result of comparing update generation numbers that are read from a plurality of disks, respectively, processing to set an update state confirmation value in the update state confirmation value management table 25 can be omitted.

The flow of a write process conducted when writing to each disk is the same as that illustrated in FIG. 7, and a description thereof using a flowchart is thus omitted here.

Figure 18:
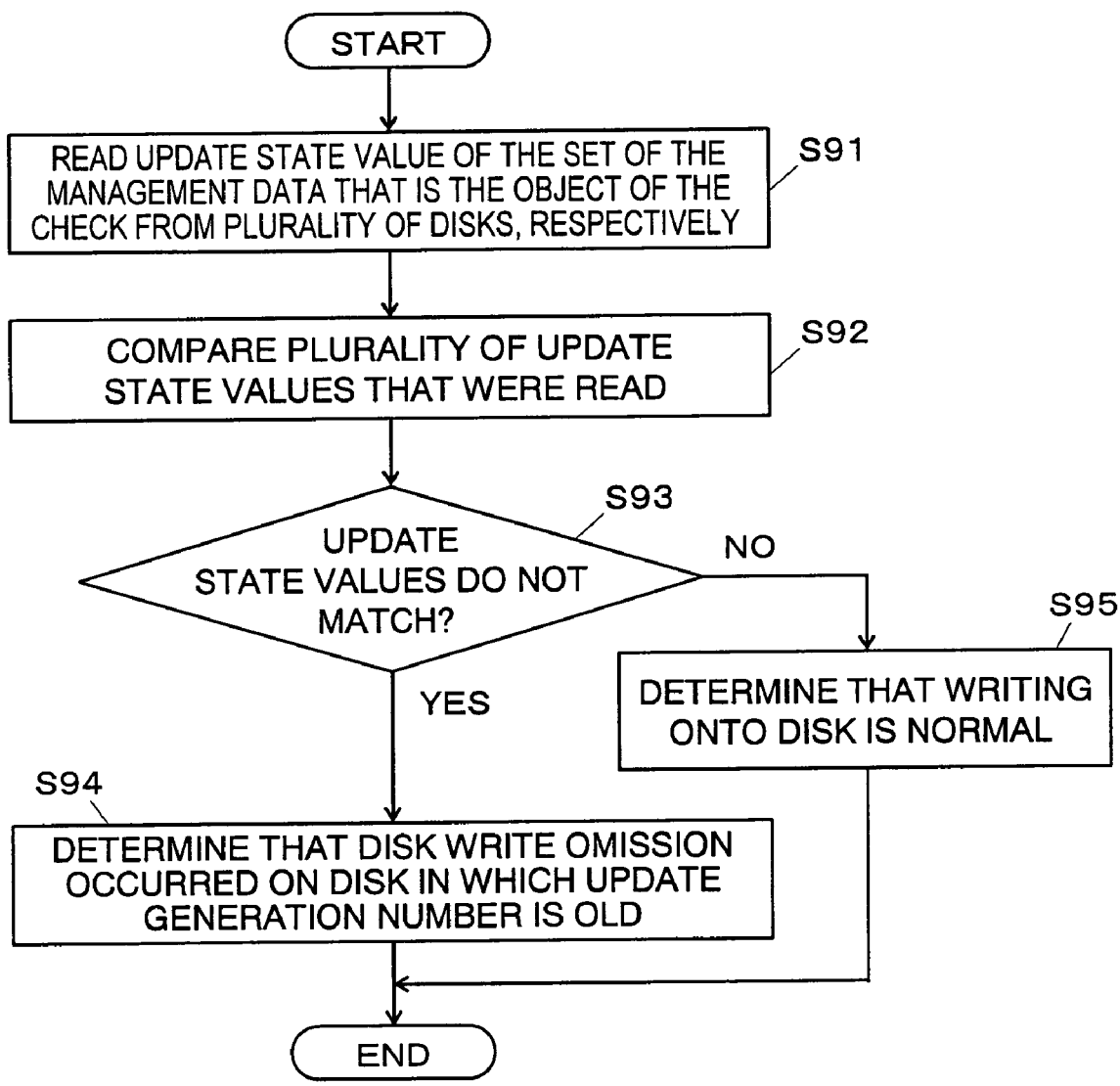
FIG. 18 is a diagram showing an example of the flow of an update state check process.

FIG. 18 is a diagram showing one example of the flow of an update state check process in the embodiment 6 of the present invention. First, the disk reading unit 23 reads the update state value of the set of management data that is the object of the check from a plurality of disks, respectively (step S91).

Next, the update state comparing unit 240 of the update state checking unit 24 compares the plurality of update state values that were read (step S92). When the update state values do not match (step S93), the disk write omission recognition unit 241 determines that a disk write omission occurred on the disk in which the update generation number is old (step S94). When the update state values match, the disk write omission recognition unit 241 determines that writing onto the disks was conducted normally (step S95).

In the embodiment 6, similarly to the embodiment 2 and the embodiment 3, instead of using an update generation number as the update state value, a data update time or a check code or the like may be used.

Figure 20:
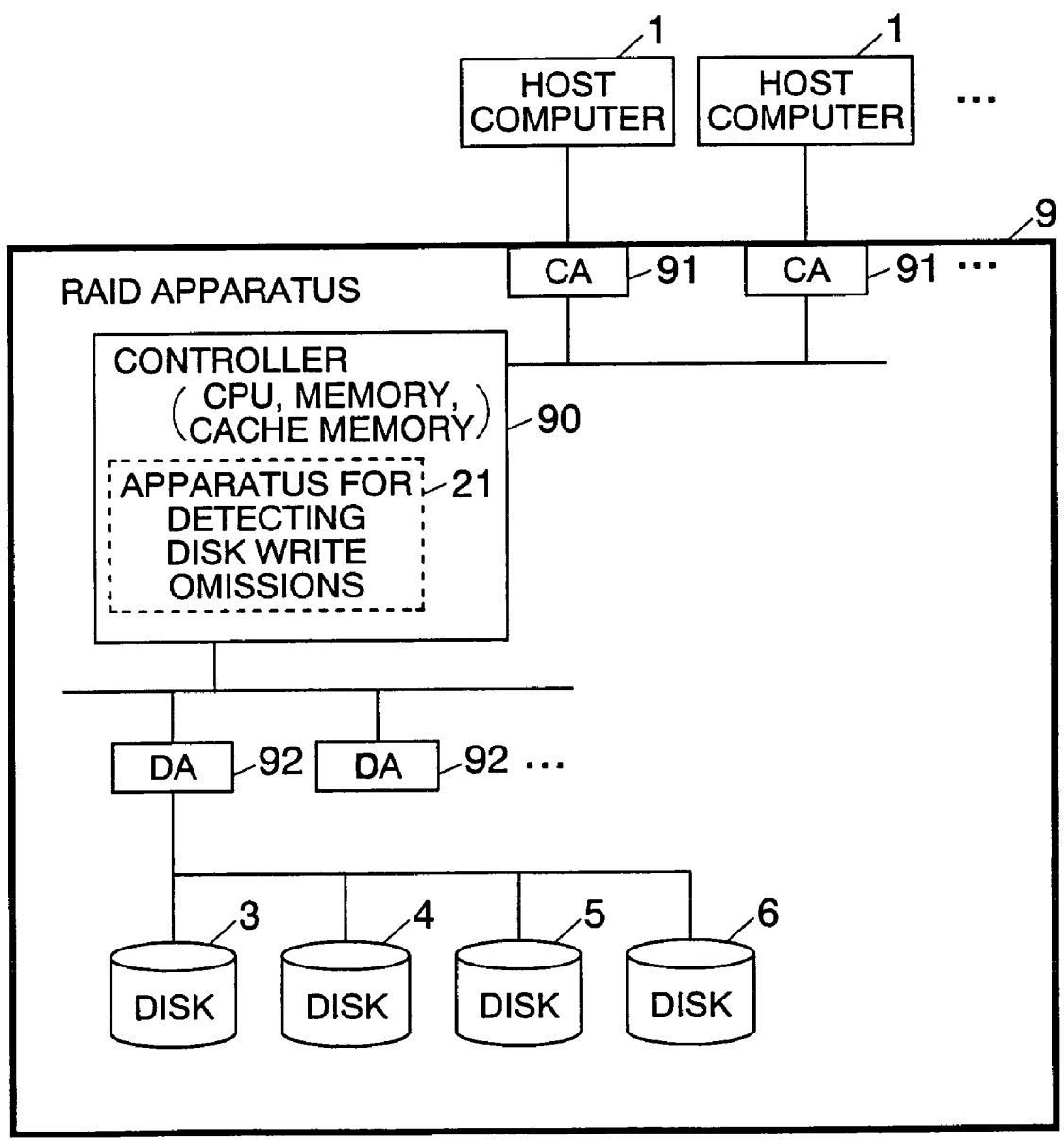
FIG. 20 is a diagram showing an example of a system configuration diagram of example 7 of the present invention.

Embodiment 7 of the present invention will be described below. FIG. 20 is a diagram showing an example of a system configuration diagram of the embodiment 7 of the present invention. A RAID apparatus 9 includes a controller 90, a CA (Channel Adapter) 91, a DA (Device Adapter) 92 and disks 3 to 6. Further, reference numeral 21 denotes an apparatus for detecting disk write omissions.

The controller 90 is implemented by hardware such as a CPU, a memory and a cache memory. The controller 90 receives a write request from a host computer 1, temporarily stores update data in the cache memory, and then writes back the update data in the cache memory on a disk.

Further, the controller 90 receives a read request from the host computer 1, temporarily stages data in the cache memory from the disk, and then sends the data in the cache memory to the host computer 1.

The apparatus for detecting disk write omissions 21 detects a write omission on a disk. In this embodiment, the apparatus for detecting disk write omissions 21 is implemented by the controller 90, and has a disk control function same as that of a conventional apparatus, in addition to a function to detect a write omission on a disk.

The CA 91 is a communication interface between the host computer 1 and the controller 90. The DA 92 is a communication interface between the controller 90 and each disk.

Figure 21:
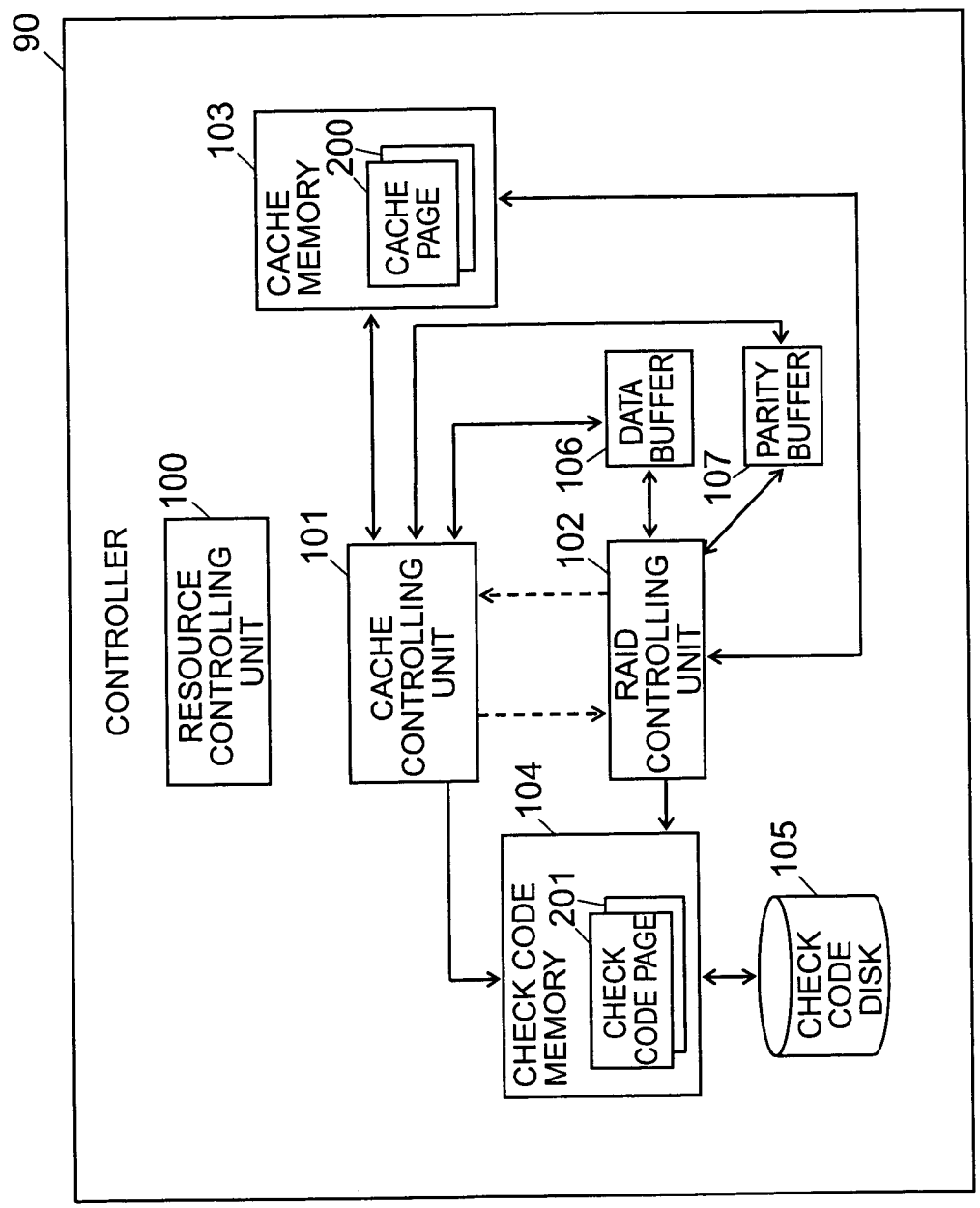
FIG. 21 is a diagram explaining an example of a configuration of a controller.

FIG. 21 shows an example of a configuration of the controller. The controller 90 includes a resource controlling unit 100, a cache controlling unit 101, a RAID controlling unit 102, a cache memory 103, a check code memory 104, a check code disk 105, a data buffer 106 and a parity buffer 107.

The resource controlling unit 100 controls a resource (for example, CA91, DA92) in the RAID apparatus 9 shown in FIG. 20. The cache controlling unit 101 manages the cache memory 103. For example, the cache controlling unit 101 makes a judgment on HIT and Miss of update data on the cache memory 103. Further, the cache controlling unit 101 issues a request to write back data in the cache memory 103 onto the disk and issues a request to stage data in the disk onto the cache memory 103 to the RAID controlling unit 102.

Further, the cache controlling unit 101 is check code generating unit making a plurality of blocks (for example, 16 blocks (8 KB)) to which update data is set as a set of management data for an object for detection of a write omission on a disk, and generating a check code for each set of management data including a data of write-back request area when writing back the update data stored in the cache memory 103 on the disk, and storing the generated check code in the check code memory 104. Here, in this embodiment, the above-mentioned set of management data for an object for detection of a write omission on a disk is described as a "check code management unit".

Further, the cache controlling unit 101 generates a check code for parity data corresponding to the set of management data including the data of write-back request area, for example, when writing back update data on the disk, and stores the check code in the check code memory 104.

Further, the cache controlling unit 101 stores the check code stored in the check code memory 104 in accordance with LRU (Least Recent Used) in the check code disk 105.

The RAID controlling unit 102 controls disk access. Namely, the RAID controlling unit 102 receives a write-back request from the cache controlling unit 101 and writes back update data in the cache memory 103 on the disk. Further, the RAID controlling unit 102 receives a staging request from the cache controlling unit 101, reads data from the disk, and stages the read data on the cache memory 103.

Further, when receiving the write-back request or the staging request from the cache controlling unit 101, the RAID controlling unit 102 makes a judgment on whether or not a check code corresponding to the check code management unit including the request area exists in the check code memory 104 judgment on Hit/Miss). When the check code does not exist in the check code memory 104, the RAID controlling unit 102 reads a check code from the check code disk 105, and stores the read check code in the check code memory 104.

Further, the RAID controlling unit 102 generates a check code based on data read from the disk, and compares the generated check code with the check code in the check code memory 104 to check the correctness of the check code. In this connection, this embodiment may employ, for example, a configuration in which the RAID controlling unit 102 reads parity data from the disk.

When the generated check code and the check code in the check code memory 104 match, the RAID controlling unit 102 performs write-back processing or staging processing, and reports completion of write-back or completion of staging to the cache controlling unit 101. If the check code generated based on the data read from the disk and the check code in the check code memory 104 do not match, the RAID controlling unit 102 determines that a write omission on a disk occurred.

More specifically, the RAID controlling unit 102 is disk write omission detecting unit reading a check code management unit including a staging request area from the disk when staging data on the cache memory 103 from the disk, storing data of the staging request area of the read check code management unit, in the cache memory 103, generating a check code from data of the staging request area stored in the cache memory 103 and data other than the data of the staging request area of the read check code management unit, comparing the generated check code with the check code stored in the check code memory 104 and corresponding to the check code management unit including the staging request area, and detecting that a write omission on a disk occurred when the generated check code and the check code stored in the check code memory 104 do not match.

Update data as an update object is temporarily stored in the cache memory 103. The cache memory 103 is divided into cache pages 200 having some degree of size as a unit. In this connection, the controller 90 includes, for example, a cache page management table (not shown) in which management information of cache pages 200 is stored.

A check code corresponding to update data for each check code management unit (for example, 16 blocks) is stored in the check code memory 104. The check code memory 104 is divided into check code pages 201 having some degree of size. The detailed configuration of the interior of the check code memory 104 will be described later. In this connection, the controller 90 includes, for example, a check code page management table (not shown) in which management information of check code pages 201 is stored.

A check code withdrawn from the check code memory 104 is stored in the check code disk 105. Data read from the disk is temporarily stored in the data buffer 106. Parity data read out from the disk is temporarily stored in the parity buffer 107.

In this embodiment, a check code is generated, for example, when a request to write back update data is issued from the cache controlling unit 101 to the RAID controlling unit 102. Further, in this embodiment, the correctness of the check code is checked, for example, when a staging request is issued from the cache controlling unit 101 to the RAID controlling unit 102.

In this connection, this embodiment may employ a configuration in which the controller 90 includes a Rebuild module (not shown in FIG. 21) issuing a request to rebuild (reconstruct) a disk to the RAID controlling unit 102, for example, in the event of failure of the disk. Further, this embodiment may employ a configuration in which the RAID controlling unit 102 receives a Rebuild request from the Rebuild module and performs disk rebuild (reconstruction) processing.

Figure 22:
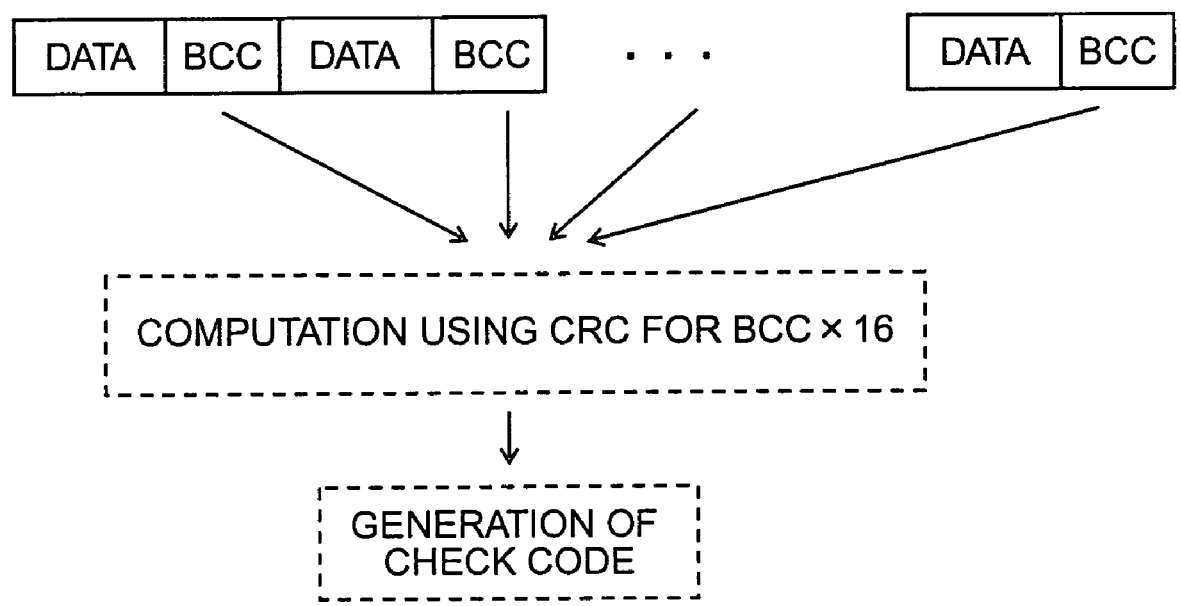
FIG. 22 is a diagram explaining generation of a check code.

FIG. 22 is a diagram explaining generation of a check code in this embodiment. In this embodiment, the controller 90 performs computation processing using a CRC, for example, for 16 BCCs added to 16 data, respectively, to generate a check code as shown in FIG. 22.

A method for management of a check code in this embodiment will now be described. The check code generated by the cache controlling unit 101 stays in the check code memory 104 for a while. The check code is expelled to the check code disk 105 in accordance with LRU (Least Recent Used).

If a relevant check code does not exist in the check code memory 104 when checking the correctness of the check code, a check code is stored in the check code memory 104 from the check code disk 105. The check code stored in the check code memory 104 is compared with the check code created from data read from the disk.

Figure 23:
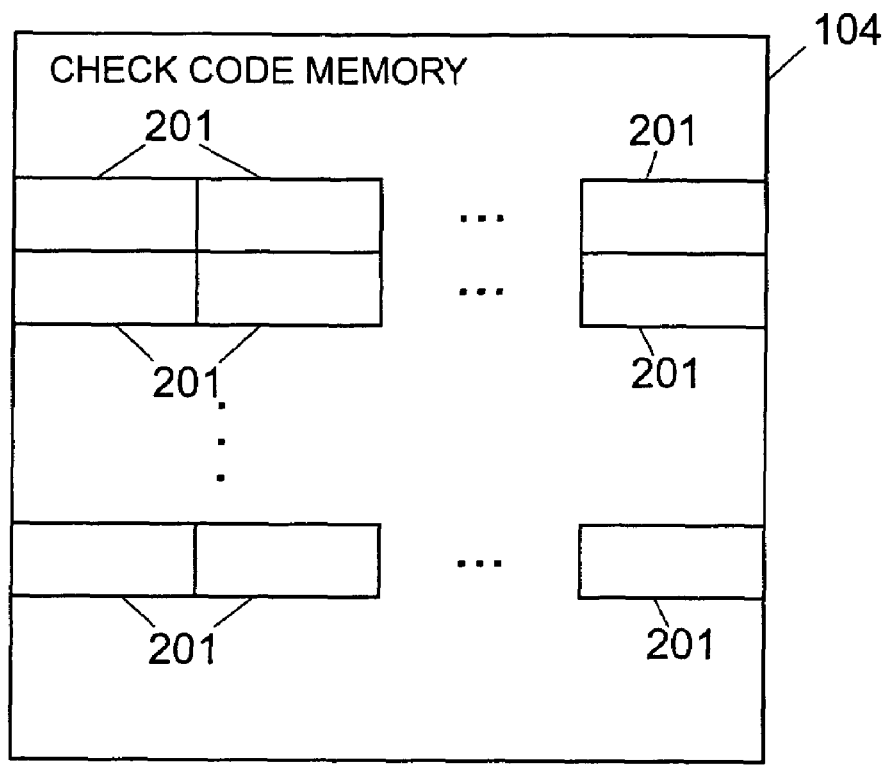
FIG. 23 is a diagram showing an example of a configuration of a check code memory.
Figure 24:
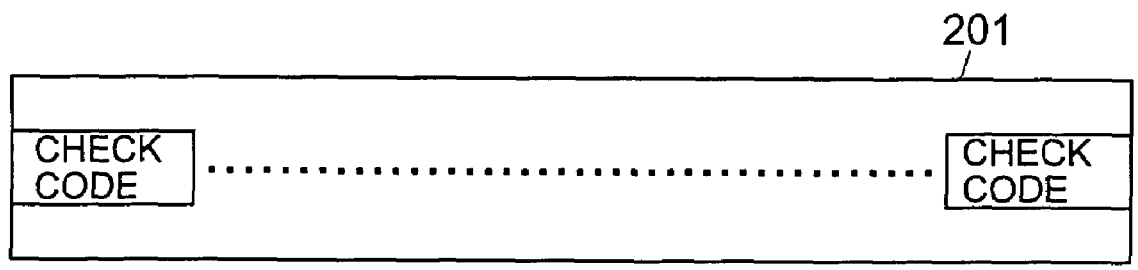
FIG. 24 is a diagram showing an example of a check code page.

In this embodiment, the check code memory 104 is divided into a large number of check code pages 201 as shown in FIG. 23. A plurality of serial check codes are stored in each check code page 201 as shown in FIG. 24. For example, 128 (512 byte) check codes are stored in each check code page 201.

FIG. 25 is a diagram explaining an example of a relation between a logical volume defined for a RAID group and a check code and a check code memory. The Raid Group includes, for example, two disks of "PLUN#0" and "PLUN#2".

As shown in FIG. 25, the logical volume defined for the RAID group has logical block addresses (LBA) such as, for example, "0x00000000", . . . , "0x0000000f".

Further, the check code shown in FIG. 25 is given a number such as "#0" or "#1" for each check code, for example. Further, the check code page 201 in the check code memory 104 shown in FIG. 25 is given a number such as "#0", . . . or "#m" for each check code page 201.

Further, regions in the check code disk 105 shown in FIG. 25 are assigned to, for example, n disks of "PLUN#0" to "PLUN#n".

As shown in FIG. 25, 16 blocks corresponding to 16 LBAs of the logical volume defined for the RAID group corresponds to each check code in the figure. For example, 16 blocks corresponding to LBAs of "0x00000000" to "0x0000000f" correspond to a check code given the number "#0".

Further, for example, 128 check codes of the number "#0" to the number "#127" shown in the figure are stored in the check code page 201 given the number "#m" in the check code memory 104 in the figure.

128 check codes stored in the check code page 201 are withdrawn into the check code disk 105 in accordance with LRU.

For example, the check code stored in the check code page 201 given the number "#m" is stored in regions allocated to a disk of "PLUN#0" and a disk of "PLUN#2" in the check code disk 105.

FIG. 26 is a diagram showing an example of a format of the check code page management table. In this connection, in FIG. 26, "16BE" means the check code page management table, and "16CC" means the check code.

"Dirty Bitmap" (offset 0x00-0x0F) is a bitmap for managing an updated check code.

The leading LBA of the check code is set to "LUN LBA" (offset 0x10-0x17). Namely, "LUN LBA" indicates a boundary of check code management units.

"LUN" (offset 0x18-0x19) indicates the number of the logical volume. "Keep Flag" indicates whether, for example, a bitmap for managing an updated check code is held. Further, "Keep Status" indicates whether, for example, a mirror is held.

"Present Bitmap" (offset 0x20-0x2F) is a bitmap for managing whether or not a check code exists in the check code memory 104 corresponding to "16CC Buffer Address" described later.

Figure 27:
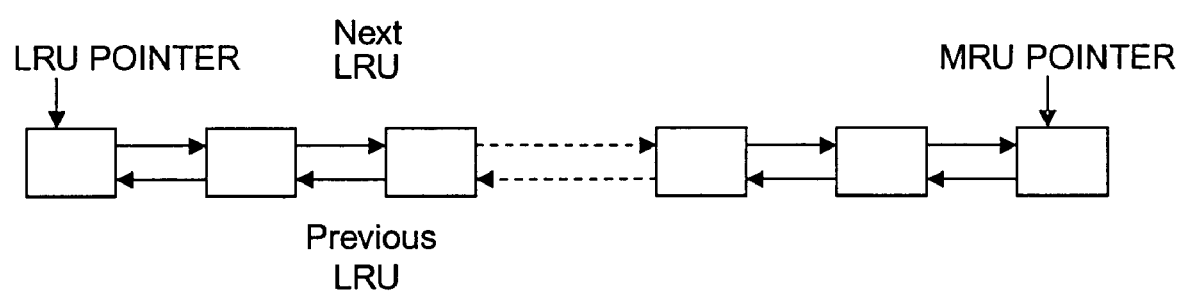
FIG. 27 is a diagram showing an example of an LRU link.

"LRU NEXT 16BE ID"/"LRU Previous 16BE ID" is a pointer for managing a link (LRU link) for performing LRU. For example, the pointer for managing the LRU link shown in FIG. 27 includes an MRU (Most Recently Used) pointer and an LRU pointer.

When the check code page management table is used, the check code page management table is connected to the MRU pointer. It is connected to the MRU pointer, for example, when the check code was updated using the check code page management table during a write-back operation or when the check code was checked using the check code page management table during a staging operation.

Further, when the check code page management table is released, the check code page management table is disconnected from the LRU link. When the check code page management table is disconnected from the LRU link, it is disconnected after ensuring that the check code page management table is in an unused state. The check code page management table disconnected from the LRU link is connected to a Free link which is a link for managing the check code page management table in an unused state.

"LUN NEXT 16BE ID"/" LUN Previous 16BE ID" is a pointer for a check code page management table link for each logical volume.

"Hash Group Next 16BE ID"/"Hash Group Previous 16BE ID", "Hash Synonym Next 16BE ID"/" Hash Synonym Previous 16BE ID" is a pointer of a link for hush control. Namely, it is a group of links for establishing association with the hush entry when synonym occurs. When synonym occurs, a Hit/Miss judgment is made on whether or not a check code page management table for the check code exists by linearly searching this link.

"Hash Entry Number" is the number of the hash entry. "Link list" indicates the type of link (for example, "Unlinked", "Free link", "LRU Link" and so on). Further, "16CC Buffer Address", "Mirror 16CC Buffer Address" indicates the address of the check code memory 104.

In this embodiment, a plurality of links are controlled for managing the check code page management table. For example, in this embodiment, link control is performed for a group of check code management links which is a group of links for managing the state of the check code page management table in addition to the link managed for each logical volume and the link associated with the hash entry described above.

All check code page management tables are connected to the aforementioned LUR link and Free link belonging to a group of check code management links.

Figure 28:
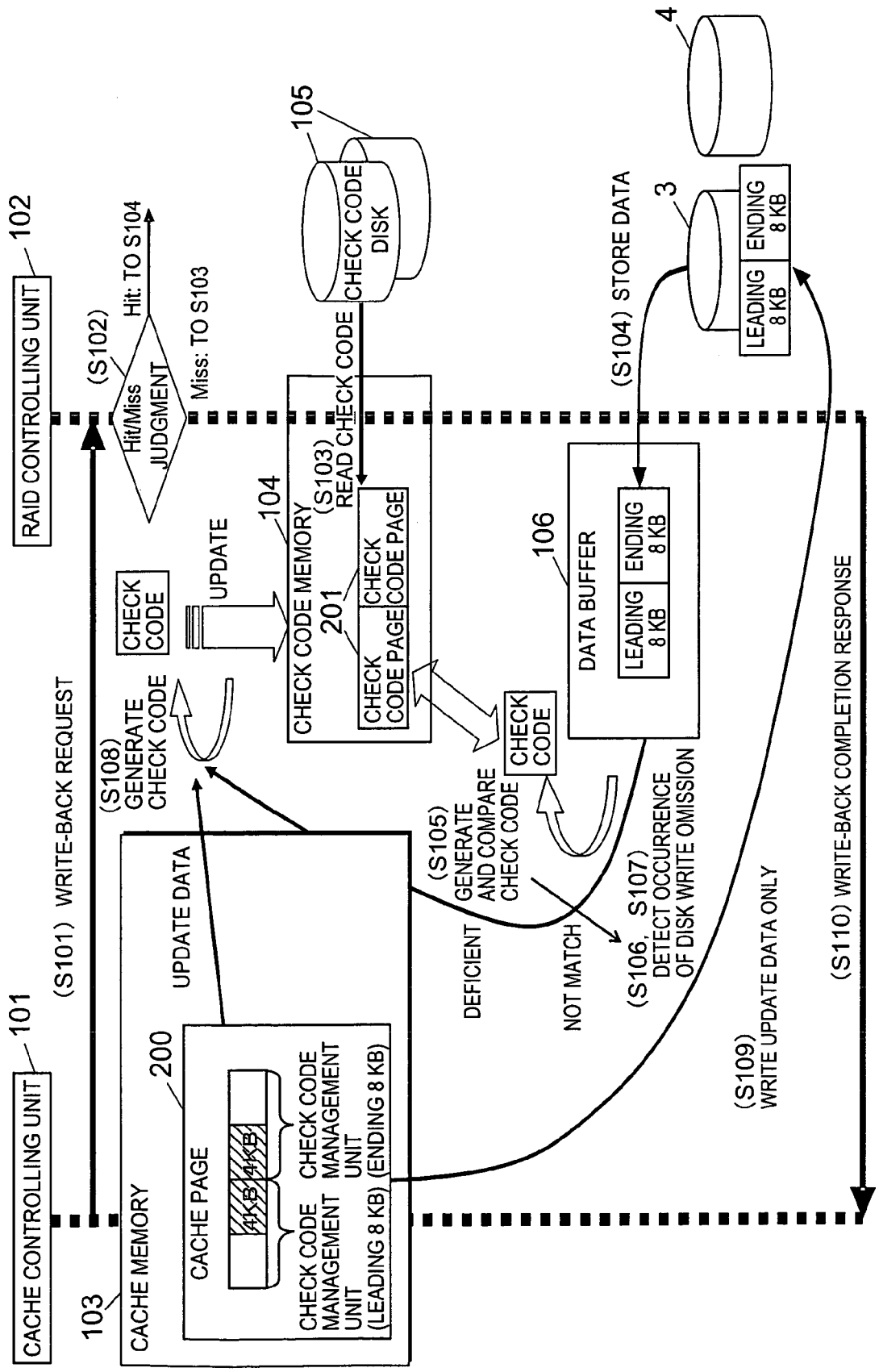
FIG. 28 is a diagram explaining an example of processing when a write-back request is issued.
Figure 29:
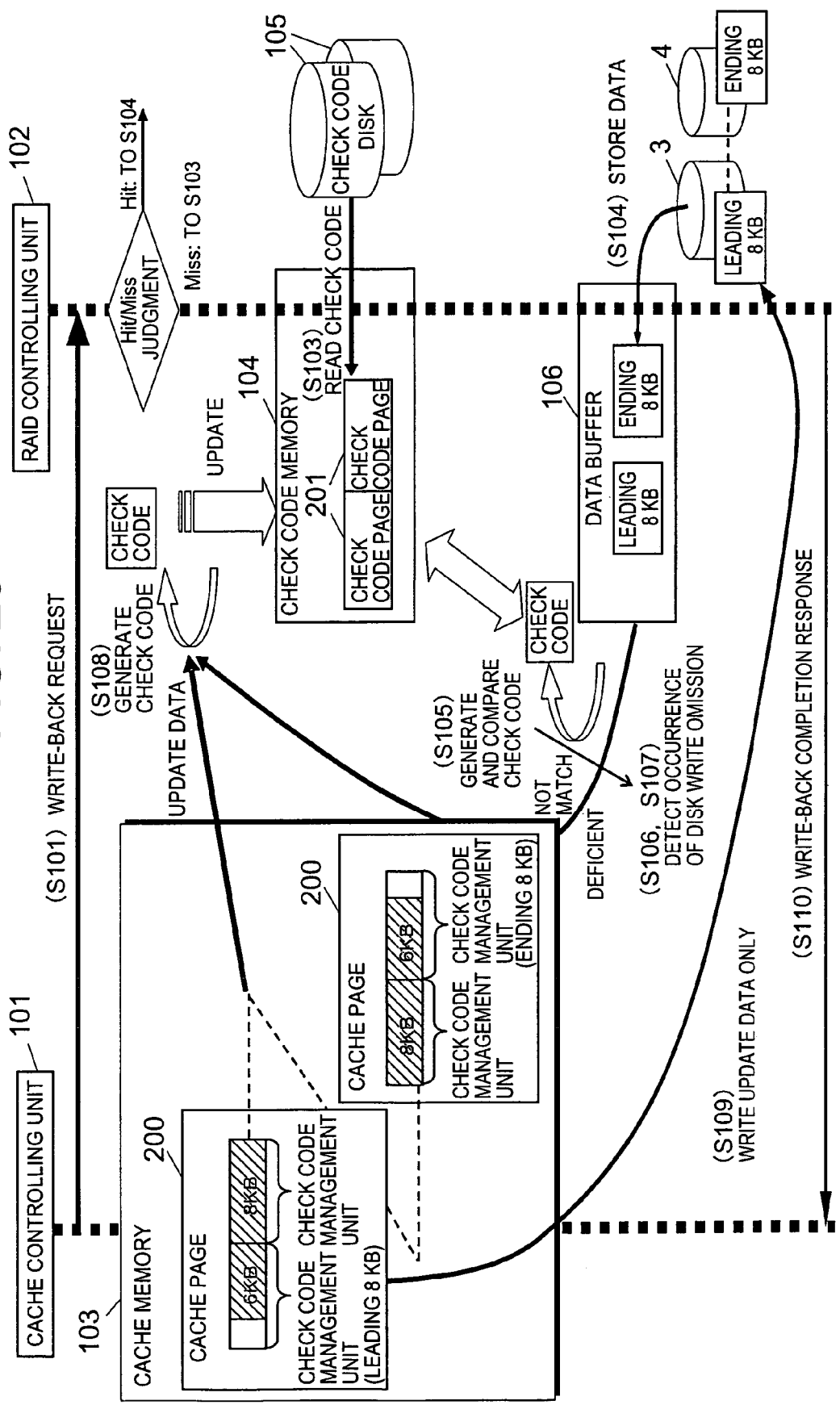
FIG. 29 is a diagram explaining an example of processing when the write-back request is issued.
Figure 30:
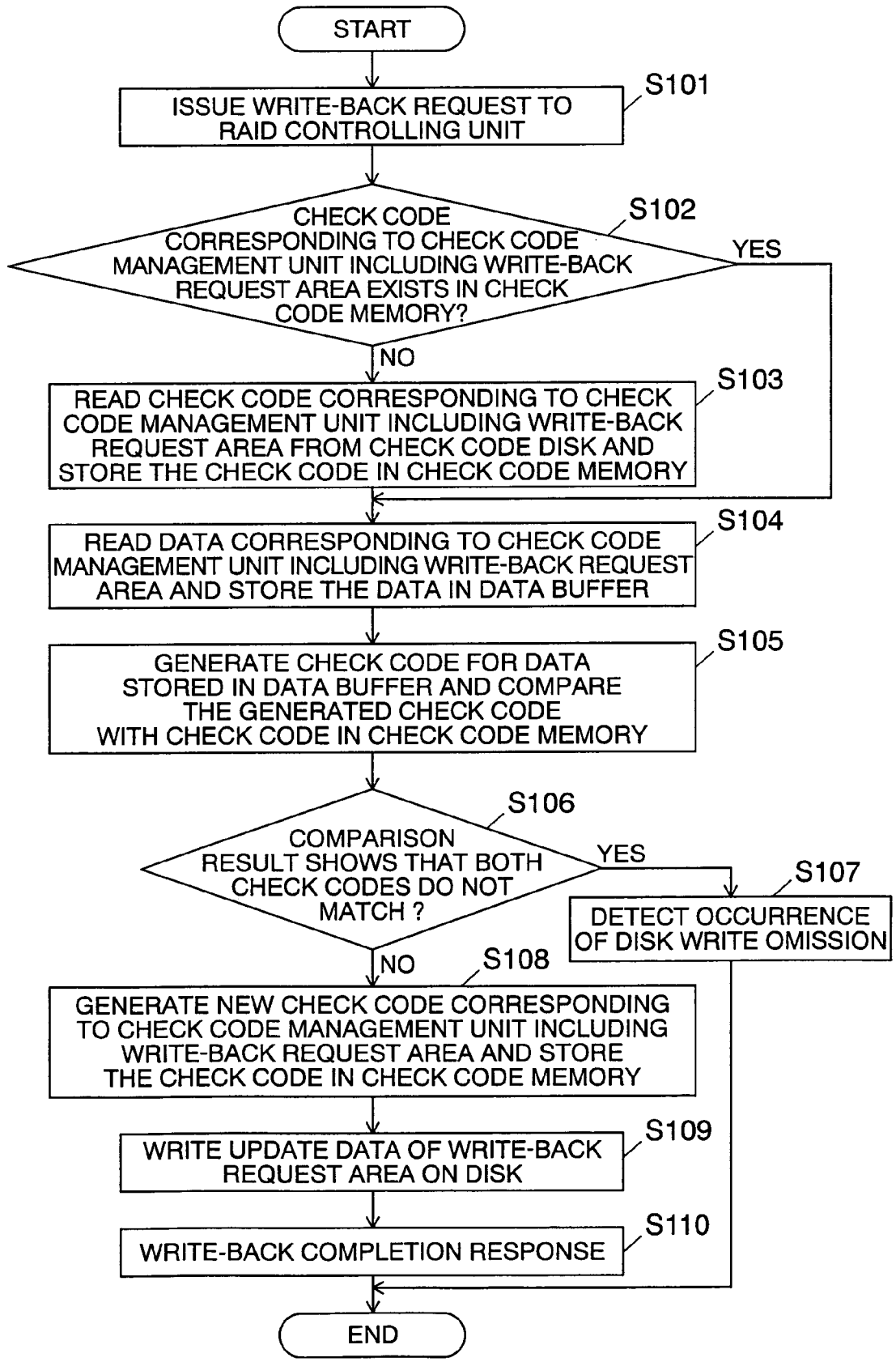
FIG. 30 is a diagram showing an example of a write-back processing flow.
Figure 31:
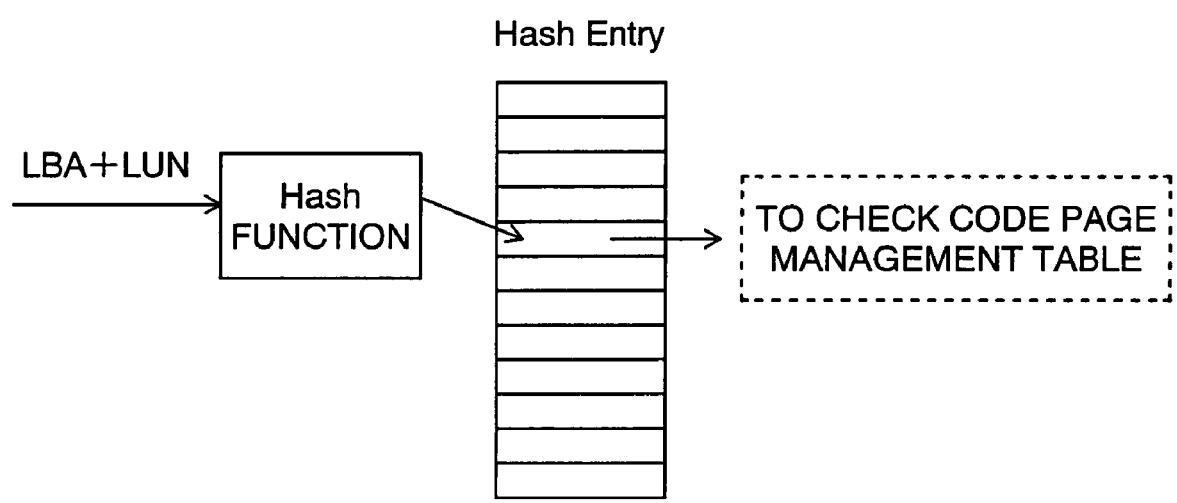
FIG. 31 is a conceptual view of Hash management.

An example of processing when a write-back request is issued in this embodiment will now be described using FIGS. 28 to 31. FIG. 28 is a diagram explaining an example of processing where the RAID level is RAID-1 and a write-back request is issued at random. FIG. 29 is a diagram explaining an example of processing where the RAID level is RAID-1 and a write-back request is issued sequentially. FIG. 30 is a diagram explaining one example of a write-back processing flow in this embodiment. Further, FIG. 31 is a conceptual diagram of Hash management.

Here, explanations will be described for the case where an area for which a write-back request was issued does not match a boundary of check code management units (for example, data unit of 16 blocks (8 KB)). For example, update data which is shown by the oblique line area in the cache page 200 shown in FIG. 28 and for which a write-back request was issued spreads across a boundary between the leading 8 KB check code management unit and the ending 8 KB check code management unit.

In the processing flow of FIG. 30, first, the cache controlling unit 101 issues a write-back request to the RAID controlling unit 102 (step S101).

The RAID controlling unit 102 makes a judgment (Hit/Miss judgment) on whether or not a check code corresponding to the check code management unit including the write-back request area exists in the check code memory 104 (step S102). Here, the check code corresponding to the check code management unit including the write-back request area refers to, for example, a check code corresponding to the leading 8 KB check code management unit and a check code corresponding to the ending 8 KB check code management unit in the cache page 200 in FIG. 28 described above.

The RAID controlling unit 102 determines whether a check code corresponding to the check code management unit including the write-back request area exists in the check code memory 104 by, for example, searching the check code page management table storing management information of each check code page 201.

The Hit/Miss determination at step S102 will be described in detail using FIG. 31. The RAID controlling unit 102 passes a hash function using as a key value of hash the LBA and LUN specified in the write-back request, for example. When the hash entry is hit as a result of passing the hash function, the RAID controlling unit 102 accesses the check code page management table in accordance with a pointer to the check code page management table stored in the hash entry. The RAID controlling unit 102 consults "Present Bitmap" of the check code page management table to make a judgment on existence/nonexistence (Hit/Miss) of a check code corresponding to the check code management unit including the write-back request area.

When a check code corresponding to the check code management unit including the write-back request area exists in the check code memory 104 as a result of processing at step S102, processing proceeds to step S104. When a check code corresponding to the check code management unit including the write-back request area does not exist in the check code memory 104, the RAID controlling unit 102 reads a check code corresponding to the check code management unit including the write-back request area from the check code disk 105 and stores the check code in the check code memory 104 (step S103).

In this embodiment, the write-back request area never exceeds 2 pages of the check code page 201 at a time. Thus, in processing at step S103, for example, the RAID controlling unit 102 acquires the check code page management table×2 for securing 2 pages of the check code page 201.

The RAID controlling unit 102 reads the check code corresponding to the check code management unit including the write-back request area from the check code disk 105, and stores the check code in 2 pages of the check code page 201 managed by the acquired check code page management table.

Next, the RAID controlling unit 102 reads data corresponding to the check code management unit including the write-back request area from the disk, and stores the data in the data buffer 106 (step S104). For example, the RAID controlling unit 102 reads data of the leading 8 KB check code management unit and data of the ending 8 KB check code management unit shown in the cache page 200 in FIG. 28 from the disk 3, and stores the data in the data buffer 106. At this time, the total 16 KB of the leading and ending data forms sequential data, and therefore processing at step S104 can be performed with one command initiation.

Next, the RAID controlling unit 102 generates a check code for the data stored in the data buffer 106 at step S104, and compares the generated check code with the check code in the check code memory 104 (step S105).

For example, the RAID controlling unit 102 generates a check code for each of the data of the leading 8 KB check code management unit and the data of the ending 8 KB check code management unit read from the disk 3. The RAID controlling unit 102 compares the check code generated from the data of the leading 8 KB check code management unit with a check code corresponding to data of the leading 8 KB check code management unit in the check code memory 104. Further, the RAID controlling unit 102 compares the check code generated from the data of the ending 8 KB check code management unit with a check code corresponding to data of the ending 8 KB check code management unit in the check code memory 104.

When the comparison result shows that both the check codes do not match (step S106), the RAID controlling unit 102 detects occurrence of a disk write omission (step S107).

When the comparison result shows that both the check codes match, the cache controlling unit 101 generates a new check code corresponding to the check code management unit including the write-back request area, and stores the new check code in the check code memory 104 (step S108). Namely, the cache controlling unit 101 extracts, for example, data of 4 KB other than update data of 4 KB, of data of the leading 8 KB check code management unit, shown in the cache page 200 of FIG. 28, from data of leading 8 KB in the data buffer 106, and merges the extracted data of 4 KB with update data of 4 KB into data of 8 KB. The cache controlling unit 101 generates a check code corresponding to the merged data of 8 KB, and stores the data in the check code memory 104.

Further, the cache controlling unit 101 extracts, for example, data of 4 KB other than update data of 4 KB shown by oblique lines, of data of the ending 8 KB check code management unit, shown in the cache page 200 of FIG. 28, from data of ending 8 KB in the data buffer 106, and merges the extracted data of 4 KB with update data of 4 KB into data of 8 KB. The cache controlling unit 101 generates a check code corresponding to the merged data of 8 KB, and stores the data in the check code memory 104.

By processing at step S108, an old check code in the check code memory 104 is updated with a generated new check code. Further, by processing at step S108, the check code page 201 in the check code memory 104 is updated. Further, along with processing at step S108, the cache controlling unit 101 updates management information in the check code page management table.

Next, the RAID controlling unit 102 writes update data of 8 KB of the write-back request area on the disk (step S109).

A write-back completion response is issued from the RAID controlling unit 102 to the cache controlling unit 101 (step S110).

When the write-back request is sequentially issued, processing is performed in the same manner as in the case where write-back is carried out at random, except that a plurality of cache page management tables (8 tables in FIG. 29) are prepared.

Figure 32:
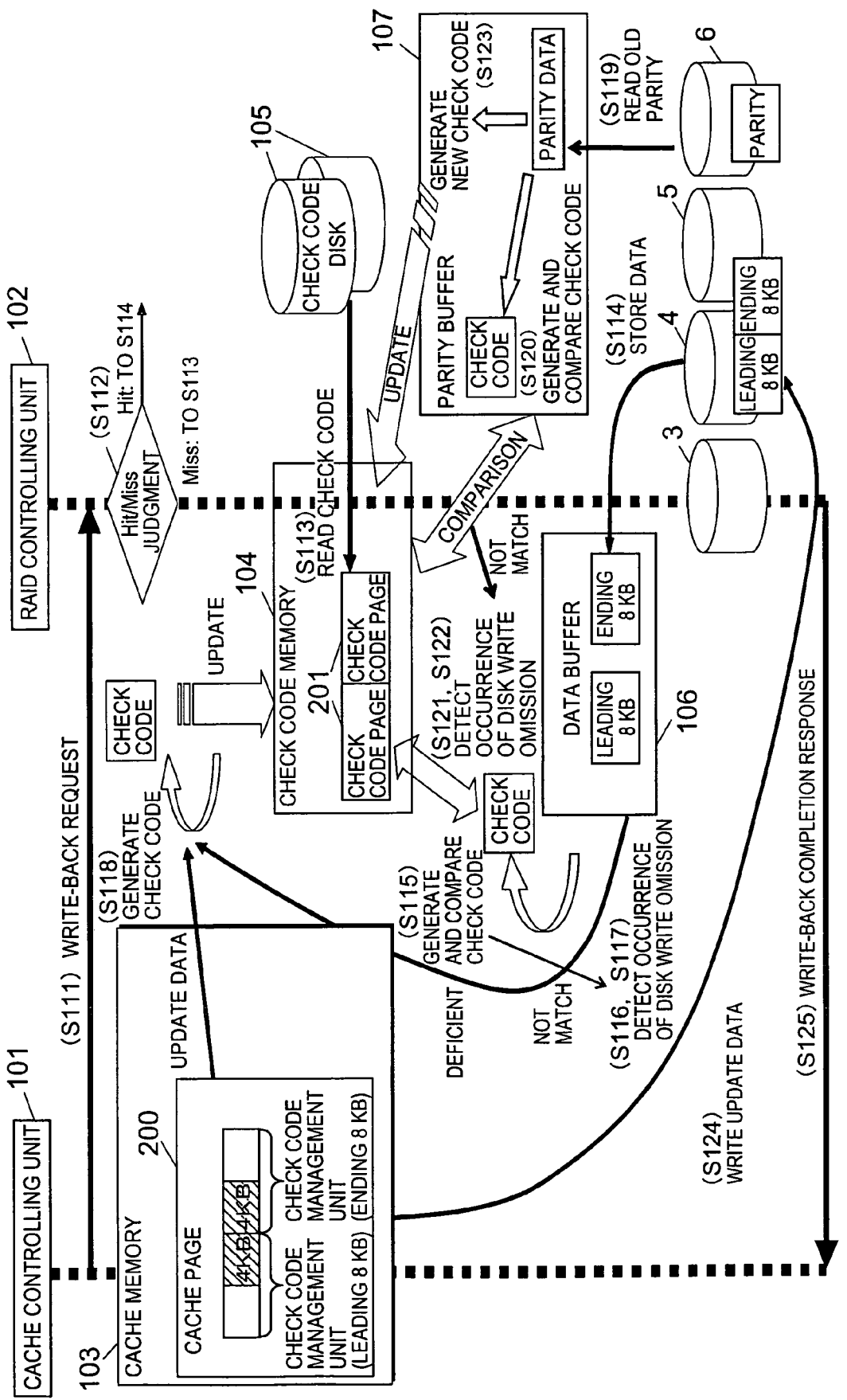
FIG. 32 is a diagram showing an example of processing when the write-back request is issued.

Another example of processing when a write-back request is issued in this embodiment will now be described using FIGS. 32 to 34. FIG. 32 is a diagram explaining an example of processing where the RAID level is RAID-5 and a write-back request is issued at random. In the example shown in FIG. 32, when a write-back request is issued, the cache controlling unit 101 also generates a check code for parity data corresponding to the check code management unit including the write-back request area, and stores the check code in the check code memory 104.

Parity data read out from the disk and corresponding to the check code management unit including an area for which a write-back request was issued is stored in the parity buffer 107 shown in FIG. 32.

Figure 33:
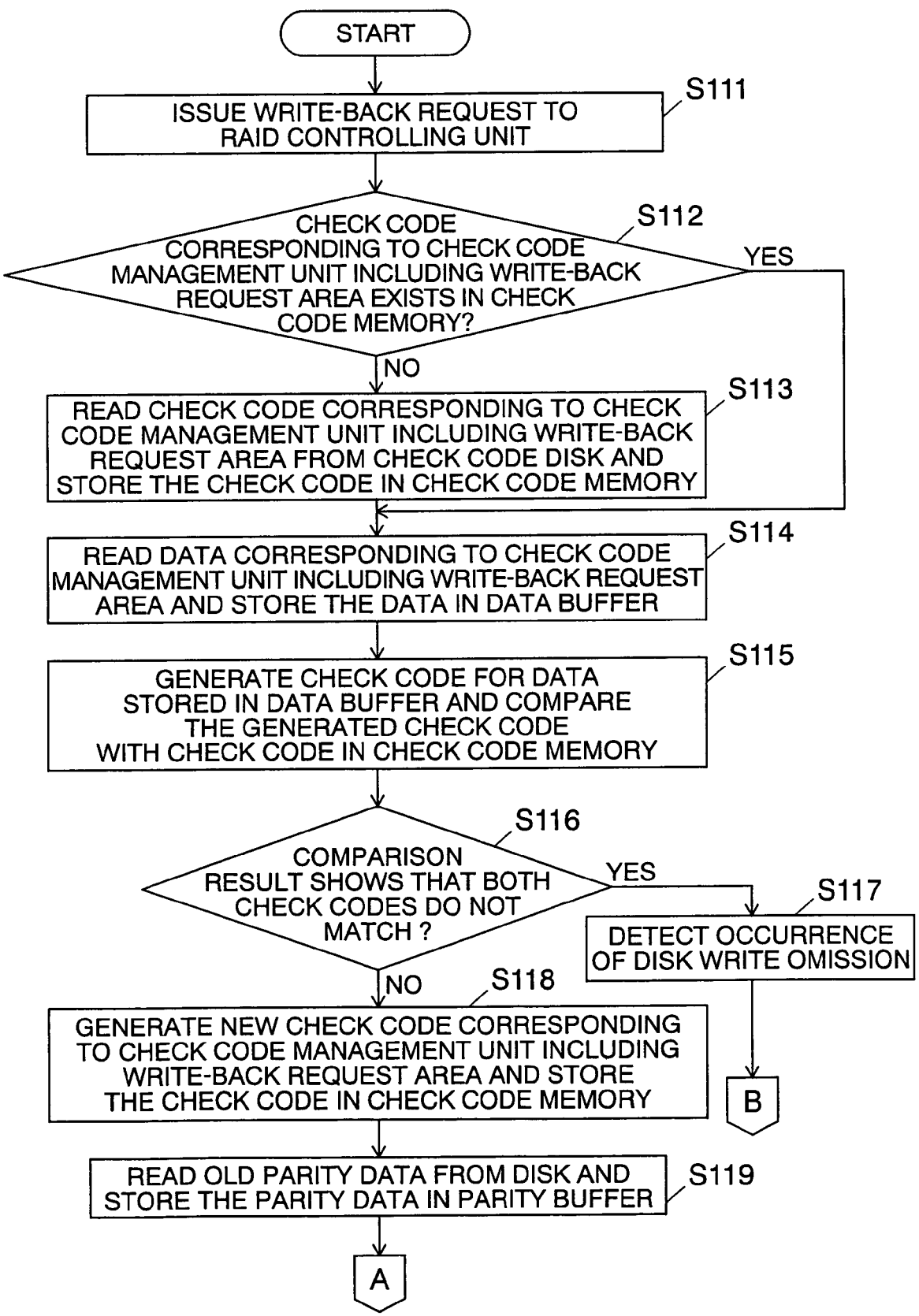
FIGS. 33 and 34 are diagrams showing an example of the write-back processing flow.
Figure 34:
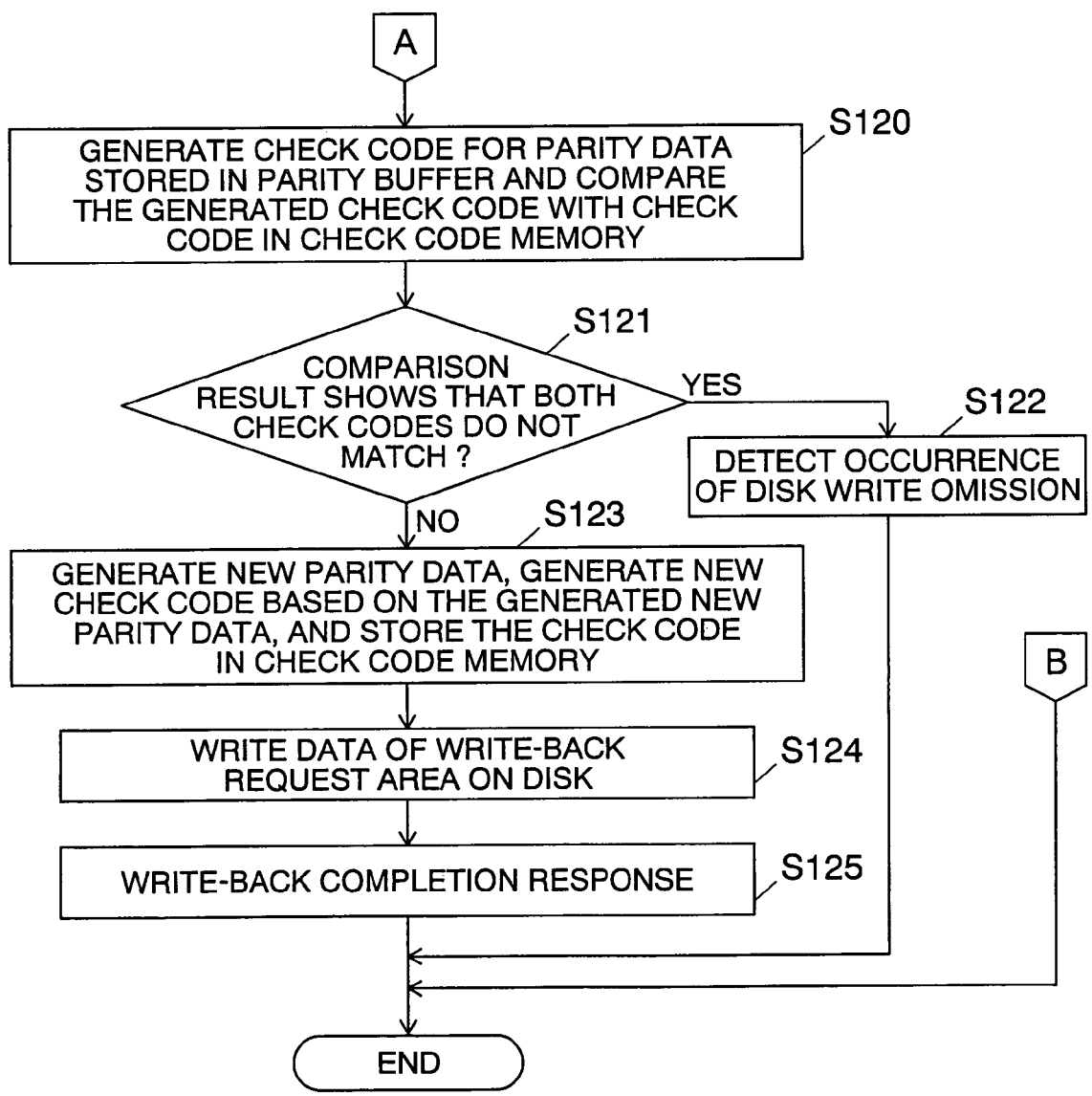

Further, FIG. 33 or 34 is a diagram showing an example of a write-back processing flow in this embodiment. Here, explanations will be described for the case where the area for which a write-back request was issued does not match the boundary of the check code management unit. For example, update data of 8 KB shown by the oblique line area, for which a write-back request was issued, in the cache page 200 shown in FIG. 32, spreads across the boundary between the leading 8 KB check code management unit and the ending 8 KB check code management unit.

In the processing flow of FIG. 33 or 34, first, the cache controlling unit 101 issues a write-back request to the RAID controlling unit 102 (step S111).

The RAID controlling unit 102 makes a judgment (Hit/Miss judgment) on whether or not a check code corresponding to the check code management unit including the write-back request area exists in the check code memory 104 (step S112). Here, the check code corresponding to the check code management unit including the write-back request area refers to, for example, the check code corresponding to the leading 8 KB check code management unit and the check code corresponding to the ending 8 KB check code management unit shown in the cache page 200 in FIG. 32 described above.

The RAID controlling unit 102 determines whether a check code corresponding to the check code management unit including the write-back request area exists in the check code memory 104 by, for example, searching the check code page management table storing management information of each check code page 201.

When a check code corresponding to the check code management unit including the write-back request area exists in the check code memory 104, processing proceeds to step S114. When a check code corresponding to the check code management unit including the write-back request area does not exist in the check code memory 104, the RAID controlling unit 102 reads a check code corresponding to the check code management unit including the write-back request area from the check code disk 105 and stores the check code in the check code memory 104 (step S113).

In this embodiment, the write-back request area never exceeds 2 pages of the check code page 201 at a time. Thus, in the above-described processing at step S113, for example, the RAID controlling unit 102 acquires the check code page management table×2 for securing 2 pages of the check code page 201.

The RAID controlling unit 102 reads the check code corresponding to the check code management unit including the write-back request area from the check code disk 105, and stores the check code in 2 pages of the check code page 201 managed by the acquired check code page management table.

Next, the RAID controlling unit 102 reads data corresponding to the check code management unit including the write-back request area from the disk, and stores the data in the data buffer 106 (step S114). For example, the RAID controlling unit 102 reads data corresponding to the leading 8 KB check code management unit and data corresponding to the ending 8 KB check code management unit shown in the cache page 200 in FIG. 32 from the disk 4, and stores the data in the data buffer 106. At this time, the total 16 KB of the leading and ending data forms sequential data, and therefore processing at step S114 can be performed with one command initiation.

Next, the RAID controlling unit 102 generates a check code for the data stored in the data buffer 106 at step S114, and compares the generated check code with the check code in the check code memory 104 (step S115).

For example, the RAID controlling unit 102 generates a check code for each of the data of the leading 8 KB check code management unit and the data of the ending 8 KB check code management unit read from the disk 4. The RAID controlling unit 102 compares the check code generated from the data of the leading 8 KB check code management unit with a check code corresponding to data of the leading 8 KB check code management unit in the check code memory 104. Further, the RAID controlling unit 102 compares the check code generated from the data of the ending 8 KB check code management unit with a check code corresponding to data of the ending 8 KB check code management unit in the check code memory 104.

When the comparison result shows that both the check codes do not match (step S116), the RAID controlling unit 102 detects occurrence of a disk write omission (step S117).

When the comparison result shows that both the check codes match, the cache controlling unit 101 generates a new check code corresponding to the check code management unit including the write-back request area, and stores the new check code in the check code memory 104 (step S118). Namely, the cache controlling unit 101 extracts, for example, data of 4 KB other than the update data of 4 KB shown by oblique lines, of data of the leading 8 KB check code management unit, shown in the cache page 200 of FIG. 32, from data of leading 8 KB in the data buffer 106, and merges the extracted data of 4 KB with update data of 4 KB into data of 8 KB. The cache controlling unit 101 generates a check code corresponding to the merged data of 8 KB, and stores the data in the check code memory 104.

Further, the cache controlling unit 101 extracts, for example, data of 4 KB other than update data of 4 KB shown by oblique lines, of data of the ending 8 KB check code management unit, shown in the cache page 200 of FIG. 32, from data of ending 8 KB in the data buffer 106, and merges the extracted data of 4 KB with update data of 4 KB into data of 8 KB. The cache controlling unit 101 generates a check code corresponding to the merged data of 8 KB, and stores the data in the check code memory 104.

By processing at step S118, an old check code in the check code memory 104 is updated with a generated new check code. Further, by processing at step S118, the check code page 201 in the check code memory 104 is updated. Further, along with processing at step S118, the cache controlling unit 101 updates management information in the check code page management table.

Next, the RAID controlling unit 102 reads old parity data from the disk and stores the parity data in the parity buffer 107 (step S119) in the same manner as in processing of storing data in the data buffer 106, performed at step S114 described above. Namely, the RAID controlling unit 102 reads parity data corresponding to data of the check code management units (leading 8 KB and ending 8 KB) including the write-back request area from the disk, and stores the parity data in the parity buffer 107.

Next, the RAID controlling unit 102 generates a check code for the parity data stored in the parity buffer 107 at step S119, and compares the generated check code with the check code in the check code memory 104 (step S120).

When the comparison result shows that both the check codes do not match (step S121), the RAID controlling unit 102 detects occurrence of a disk write omission (step S122).

When the comparison result shows that both the check codes match, the cache controlling unit 101 generates new parity data, generates a new check code based on the generated new parity data, and stores the check code in the check code memory 104 (step S123).

The cache controlling unit 101 first generates new parity data corresponding to update data from old data, old parity data and update data. Thereafter, a new check code corresponding to the check code management unit is generated based on the generated new parity data, and the check code page in the check code memory 104 is updated with the generated new check code.

Next, the RAID controlling unit 102 writes data of the write-back request area (update data of 8 KB shown by oblique lines in FIG. 32) on the disk (step S124). At step S124, the new parity data generated at step S123 is written on the disk.

A write-back completion response is issued from the RAID controlling unit 102 to the cache controlling unit 101 (step S125).

When the write-back request is sequentially issued, processing is performed in the same manner as in the case where write-back request is issued at random, except that a large number of cache page management tables are prepared.

Figure 35:
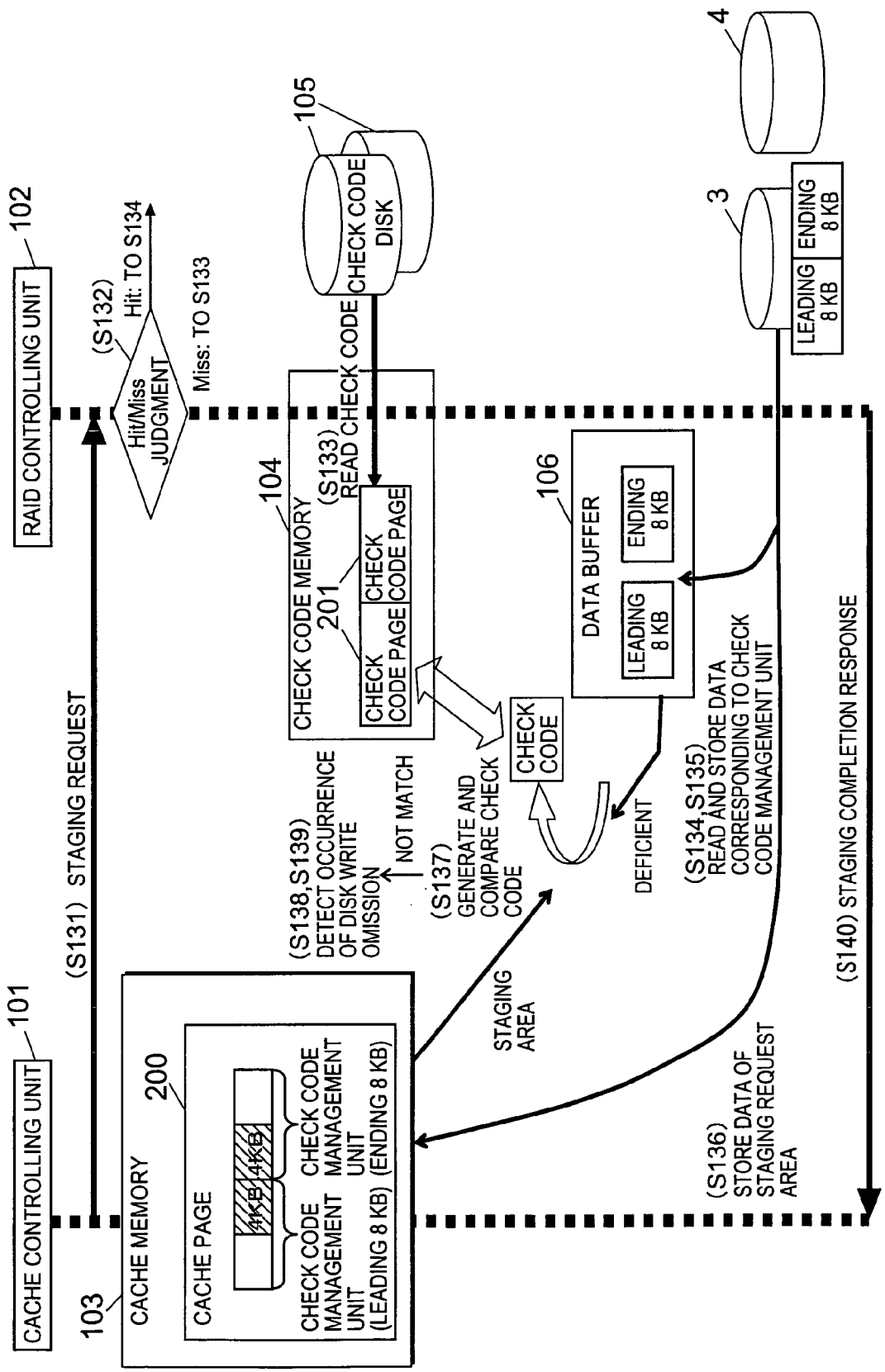
FIG. 35 is a diagram explaining an example of processing when a staging request is issued.

An example of processing when a staging request is issued in this embodiment will now be described using FIGS. 35 and 36. FIG. 35 is a diagram explaining an example of processing where the RAID level is RAID-1 and the staging request is issued at random. Further, FIG. 36 is a diagram showing an example of a staging processing flow in this embodiment.

Here, explanations will be described for the case where the area for which a staging request was issued does not match the boundary of check code management units (for example, 16 blocks (8 KB)). For example, the staging request area of 8 KB shown by the oblique line area, in the cache page 200 shown in FIG. 35, spreads across the boundary between the leading 8 KB check code management unit and the ending 8 KB check code management unit.

Figure 36:
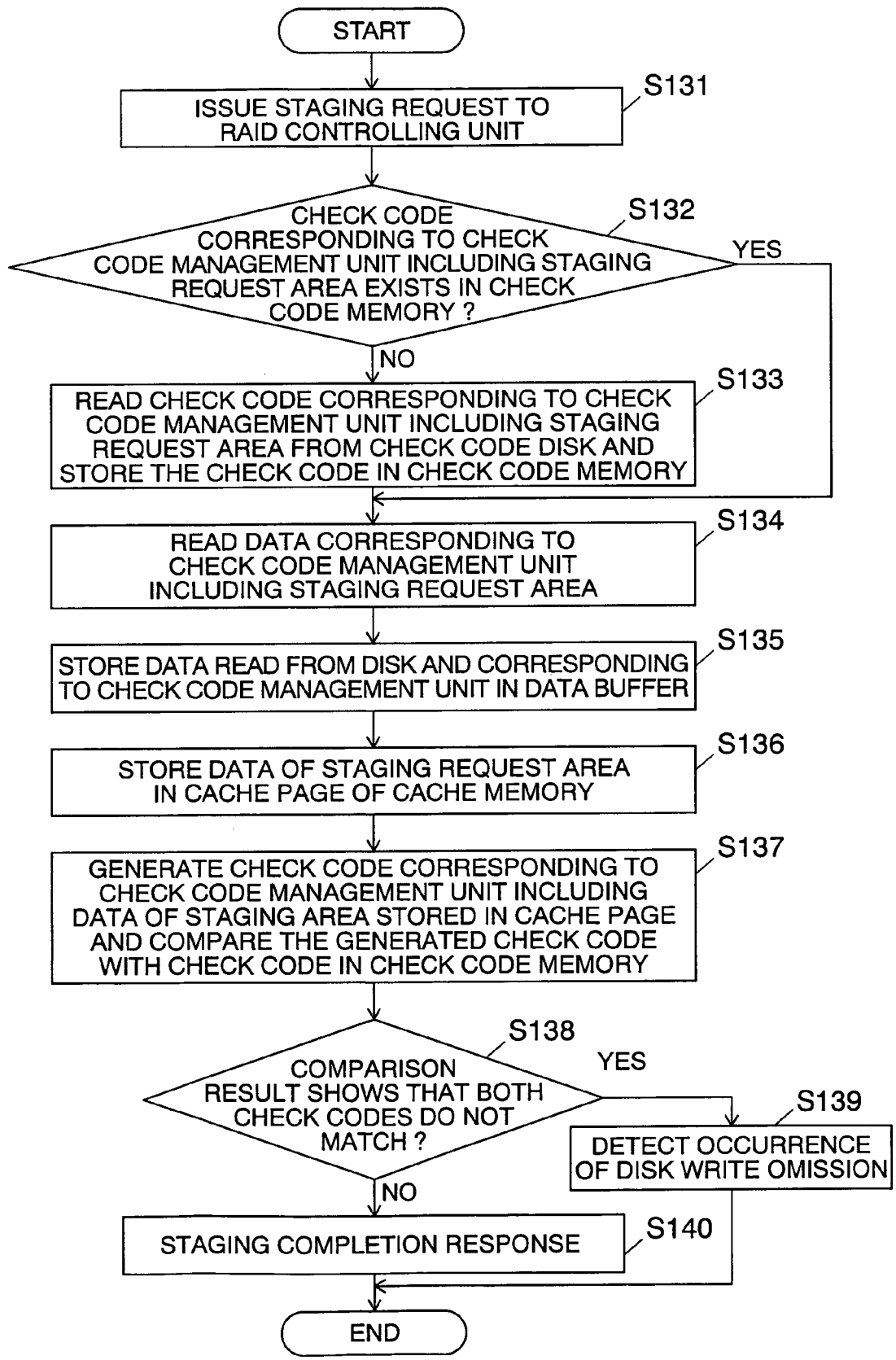
FIG. 36 is a diagram showing an example of a staging processing flow.

As shown in the processing flow of FIG. 36, first, the cache controlling unit 101 issues a staging request to the RAID controlling unit 102 (step S131).

The RAID controlling unit 102 makes a judgment (Hit/Miss judgment) on whether or not a check code corresponding to the check code management unit including the staging request area exists in the check code memory 104 (step S132). Here, the check code corresponding to the check code management unit including the staging request area refers to, for example, the check code corresponding to the leading 8 KB check code management unit and the check code corresponding to the ending 8 KB check code management unit shown in the cache page 200 in FIG. 35.

The RAID controlling unit 102 determines whether a check code corresponding to the check code management unit including the staging request area exists in the check code memory 104 by, for example, searching the check code page management table storing management information of each check code page 201 in the same manner as in the aforementioned processing when a write-back request is issued.

When a check code corresponding to the check code management unit including the staging request area exists in the check code memory 104, processing proceeds to step S134. When a check code corresponding to the check code management unit including the staging request area does not exist in the check code memory 104, the RAID controlling unit 102 reads a check code corresponding to the check code management unit including the staging request area from the check code disk 105 and stores the check code in the check code memory 104 (step S133).

In this embodiment, the staging request area never exceeds 2 pages of the check code page 201 at a time. Thus, in the above-described processing at step S133, for example, the RAID controlling unit 102 acquires the check code page management table×2 for securing 2 pages of the check code page 201.

The RAID controlling unit 102 reads the check code corresponding to the check code management unit including the staging request area from the check code disk 105, and stores the check code in 2 pages of the check code page 201 managed by the acquired check code page management table.

Next, the RAID controlling unit 102 reads data corresponding to the check code management unit including the staging request area from the disk (step S134). For example, the RAID controlling unit 102 reads data corresponding to the leading 8 KB check code management unit and data corresponding to the ending 8 KB check code management unit shown in the cache page 200 in FIG. 35 from the disk 3.

The RAID controlling unit 102 stores the data read from the disk and corresponding to the check code management unit in the data buffer 106 (step S135) and stores data of the staging request area in the cache page 200 of the cache memory 103 (step S136). For example, the RAID controlling unit 102 stores the data of leading 8 KB and ending 8 KB read from the disk 3 in the data buffer 106. Further, the RAID controlling unit 102 stores data of the staging request area of 4 KB, of the data of leading 8 KB read from the disk 3, in the cache page 200.

Further, the RAID controlling unit 102 stores data of the staging request area of 4 KB, of the data of ending 8 KB read from the disk, in the cache page 200.

As a result, as shown in FIG. 35, data of the area (8 KB) shown by oblique lines is staged on the cache page 200.

Next, the RAID controlling unit 102 generates a check code corresponding to the check code management unit including the data of the staging area stored in the cache page 200, and compares the generated check code with the check code in the check code memory 104 (step S137).

For example, the RAID controlling unit 102 generates a check code from data of 4 KB other than the data of the staging request area in data of leading 8 KB stored in the data buffer 106 and data of the staging area of 4 KB stored in the leading 8 KB check code management unit in the cache page 200, and compares the generated check code with the check code in the check code memory 104.

Further, for example, the RAID controlling unit 102 generates a check code from data of 4 KB other than the data of the staging request area in data of ending 8 KB stored in the data buffer 106 and data of the staging area of 4 KB stored in the ending 8 KB check code management unit in the cache page 200, and compares the generated check code with the check code in the check code memory 104.

When the comparison result shows that both the check codes do not match (step S138), the RAID controlling unit 102 detects occurrence of a disk write omission (step S139).

When the comparison result shows that both the check code match, a staging completion response is issued from the RAID controlling unit 102 to the cache controlling unit 101 (step S140).

In this embodiment, processing where the staging request is issued sequentially is same as the above-described processing where the staging request is issued at random.

Processing where the RAID level is RAID-5 and the staging request is issued at random is same as the above-described processing where the RAID level is RAID-1 except that the RAID controlling unit 102 generates a check code from parity data read from the disk, and compares the generated check code with the check code in the check code memory 104 to check the correctness of staging.

Processing where the RAID level is RAID-5 and the staging request is issued sequentially is same as the processing where the RAID level is RAID-5 and the staging request is issued at random.

Figure 37:
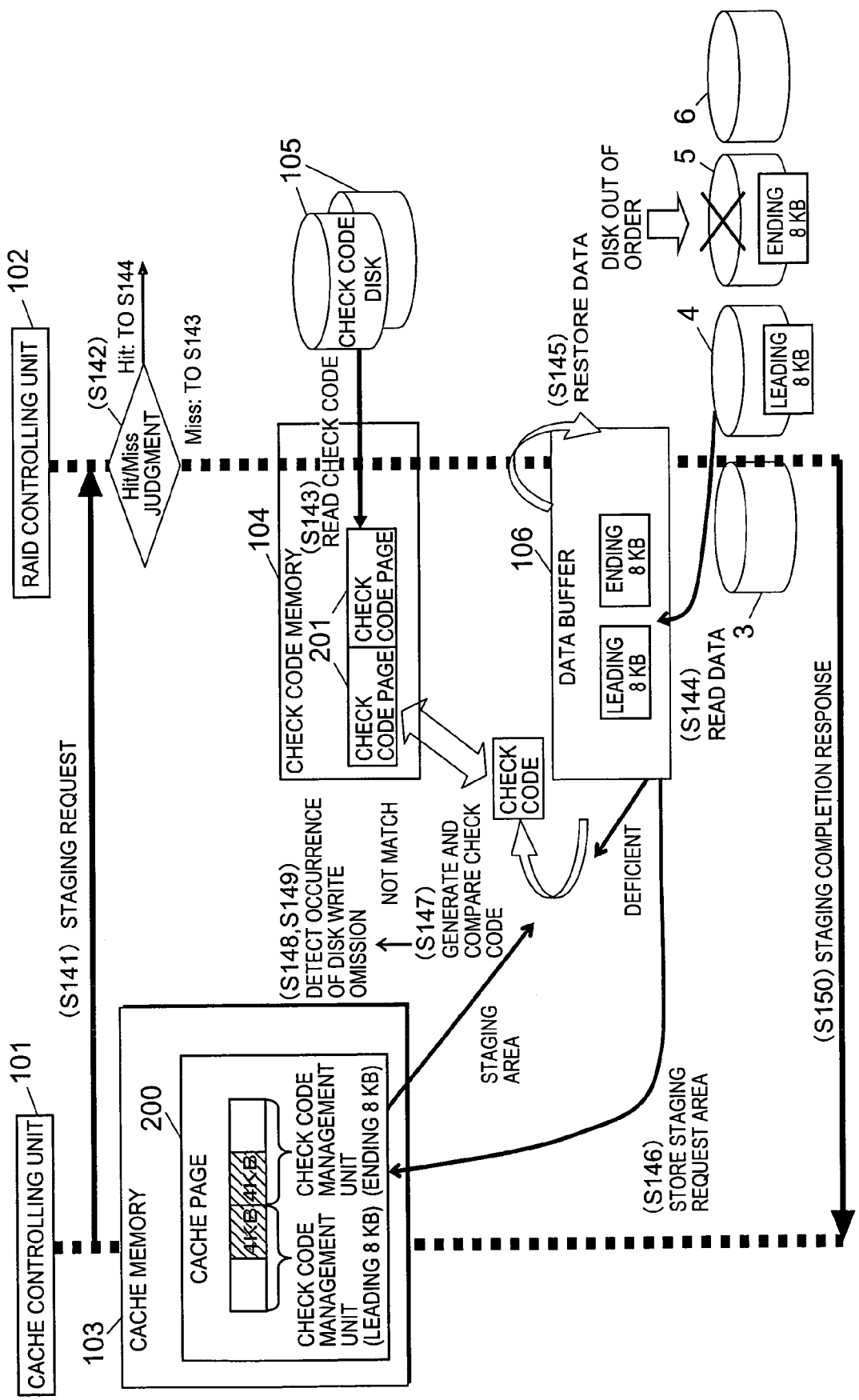
FIG. 37 is a diagram explaining an example of processing when the staging request is issued.

Another example of processing when a staging request is issued in this embodiment will be described using FIGS. 37 and 38. FIG. 37 is a diagram explaining an example of processing where the RAID level is RAID-5 and a disk is out of order and in an exposed state. Further, FIG. 38 is a diagram showing an example of a staging processing flow in this embodiment.

In this embodiment, the area for which the staging request was issued does not match a boundary of data units of check code management units (for example, 16 blocks (8 KB)). For example, the staging request area of 8 KB shown by the oblique line area, in the cache page 200 shown in FIG. 37, spreads across the boundary between the leading 8 KB check code management unit and the ending 8 KB check code management unit.

Further, in this embodiment, for example, the data of the ending 8 KB check code management unit is stored in the out-of-order disk (disk 5 in the example shown in FIG. 37).

Figure 38:
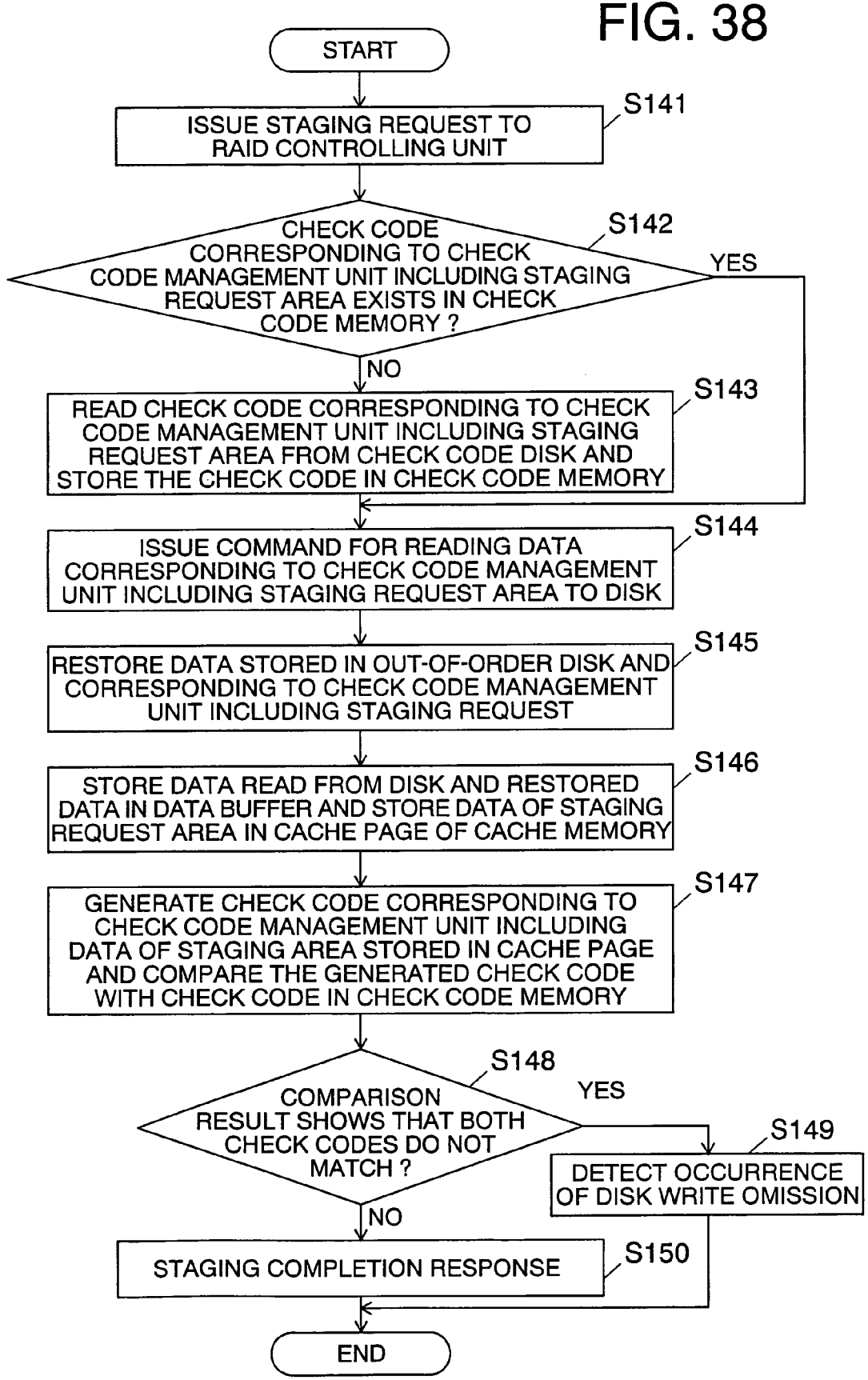
FIG. 38 is a diagram showing an example of the staging processing flow.

As shown in FIGS. 37 and 38, first, the cache controlling unit 101 issues a staging request to the RAID controlling unit 102 (step S141).

The RAID controlling unit 102 makes a judgment (Hit/Miss judgment) on whether or not a check code corresponding to the check code management unit including the staging request area exists in the check code memory 104 (step S142). Here, the check code corresponding to the check code management unit including the staging request area refers to, for example, the check code corresponding to the leading 8 KB check code management unit and the check code corresponding to the ending 8 KB check code management unit shown in the cache page 200 in FIG. 37.

For example, the RAID controlling unit 102 searches the check code page management table storing management information of each check code page 201 to determine whether a check code corresponding to the check code management unit including the staging request area exists in the check code memory 104.

When a check code corresponding to the check code management unit including the staging request area exists in the check code memory 104, processing proceeds to step S144. When a check code corresponding to the check code management unit including the staging request area does not exist in the check code memory 104, the RAID controlling unit 102 reads a check code corresponding to the check code management unit including the staging request area from the check code disk 105 and stores the check code in the check code memory 104 (step S143).

In this embodiment, the staging request area never exceeds 2 pages of the check code page 201 at a time. Thus, in the above-described processing at step S143, for example, the RAID controlling unit 102 acquires the check code page management table×2 for securing 2 pages of the check code page 201.

The RAID controlling unit 102 reads the check code corresponding to the check code management unit including the staging request area from the check code disk 105, and stores the check code in 2 pages of the check code page 201 managed by the acquired check code page management table.

Next, the RAID controlling unit 102 issues to the disk a command for reading data corresponding to the check code management unit including the staging request area (step S144). By the processing at step S144, for example, data corresponding to the leading 8 KB check code unit including the staging request area in the disk 4 is stored in the data buffer 106.

The RAID controlling unit 102 restores data stored in the out-of-order disk and corresponding to the check code management unit including the staging request (step S145). For example, the RAID controlling unit 102 restores data of the ending 8 KB check code management unit stored in the out-of-order disk 5.

The RAID controlling unit 102 stores the data read from the disk 4 and the restored data in the data buffer 106, and stores the data of the staging request area in the cache page 200 of the cache memory 103 (step S146).

For example, the RAID controlling unit 102 stores the data of leading 8 KB read from the disk 4 and the restored data of ending 8 KB in the data buffer 106. Further, the RAID controlling unit 102 stores data of the staging request area of 4 KB, of the data of leading 8 KB read from the disk 4, in the cache page 200.

Further, the RAID controlling unit 102 stores data of the staging request area of 4 KB, of the restored data of ending 8 KB, in the cache page 200.

As a result, as shown in FIG. 37, data of the area (8 KB) shown by oblique lines is staged on the cache page 200.

Next, the RAID controlling unit 102 generates a check code corresponding to the check code management unit including data of the staging area stored in the cache page 200, and compares the generated check code with the check code in the check code memory 104 (step S147).

For example, the RAID controlling unit 102 generates a check code from data of 4 KB other than data of the staging request area in data of leading 8 KB stored in the data buffer 106, and data of the staging area of 4 KB stored in the cache page 200, and compares the generated check code with the check code in the check code memory 104.

Further, for example, the RAID controlling unit 102 generates a check code from data of 4 KB other than data of the staging request area in data of ending 8 KB stored in the data buffer 106, and data of the staging area of 4 KB stored in the cache page 200, and compares the generated check code with the check code in the check code memory 104.

When the comparison result shows that both the check codes do not match (step S148), the RAID controlling unit 102 detects occurrence of a disk write omission (step S149).

When the comparison result shows that both the check code match, a staging completion response is issued from the RAID controlling unit 102 to the cache controlling unit 101 (step S150).

Figure 39:
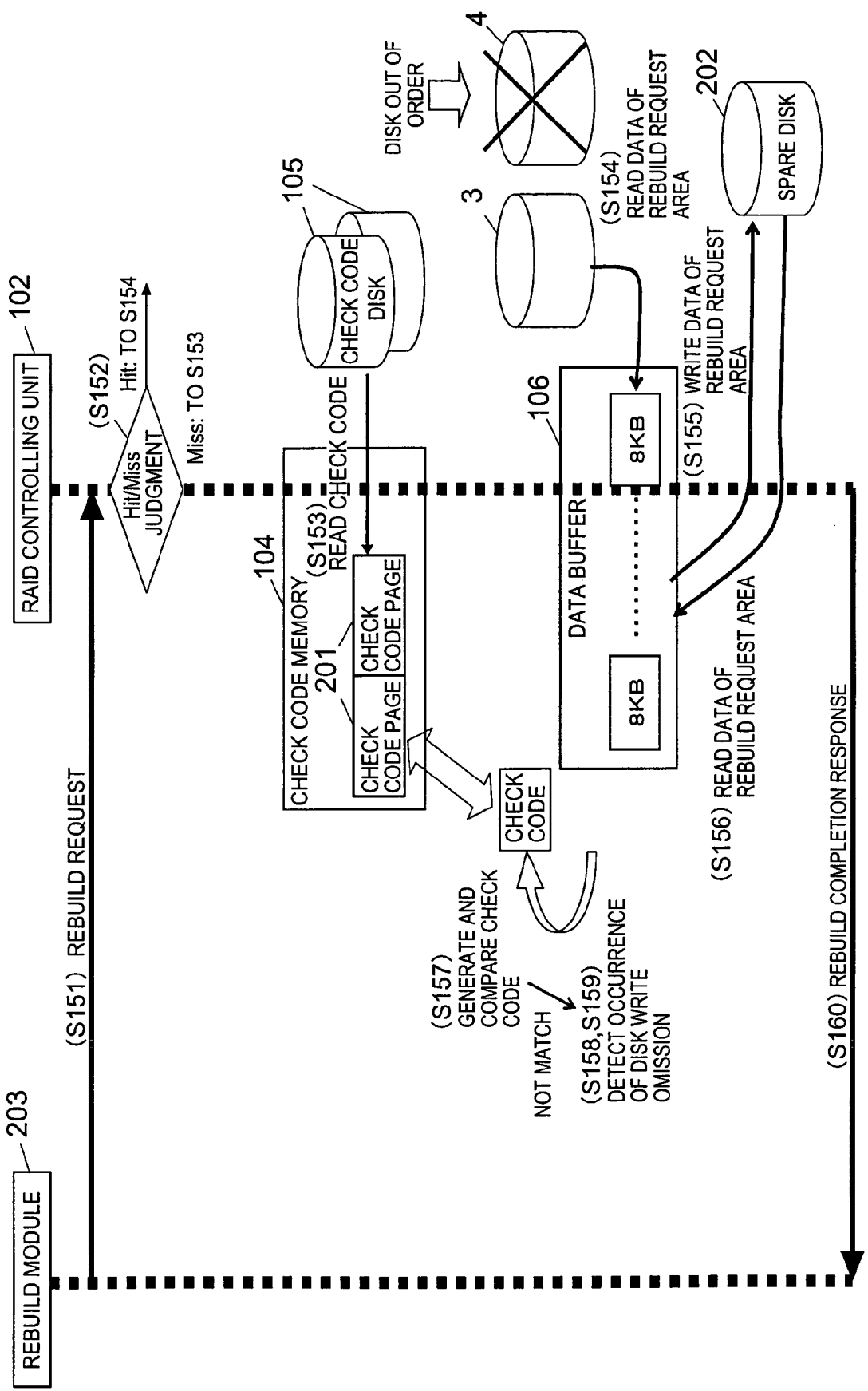
FIG. 39 is a diagram explaining an example of processing of Rebuild of a disk.

An example of processing of Rebuild (reconstruction) of a disk in the event of failure of the disk in this embodiment will be described using FIGS. 39 and 40. FIG. 39 is a diagram explaining an example of Rebuild (reconstruction) processing where the RAID level is RAID-1 and one disk (disk 4 in FIG. 39) of RAID-1 is out of order. Reference numeral 202 in FIG. 39 denotes a spare disk in which data of an area for which a Rebuild request was issued is written. Further, reference numeral 203 is a Rebuild module provided in the controller 90.

Figure 40:
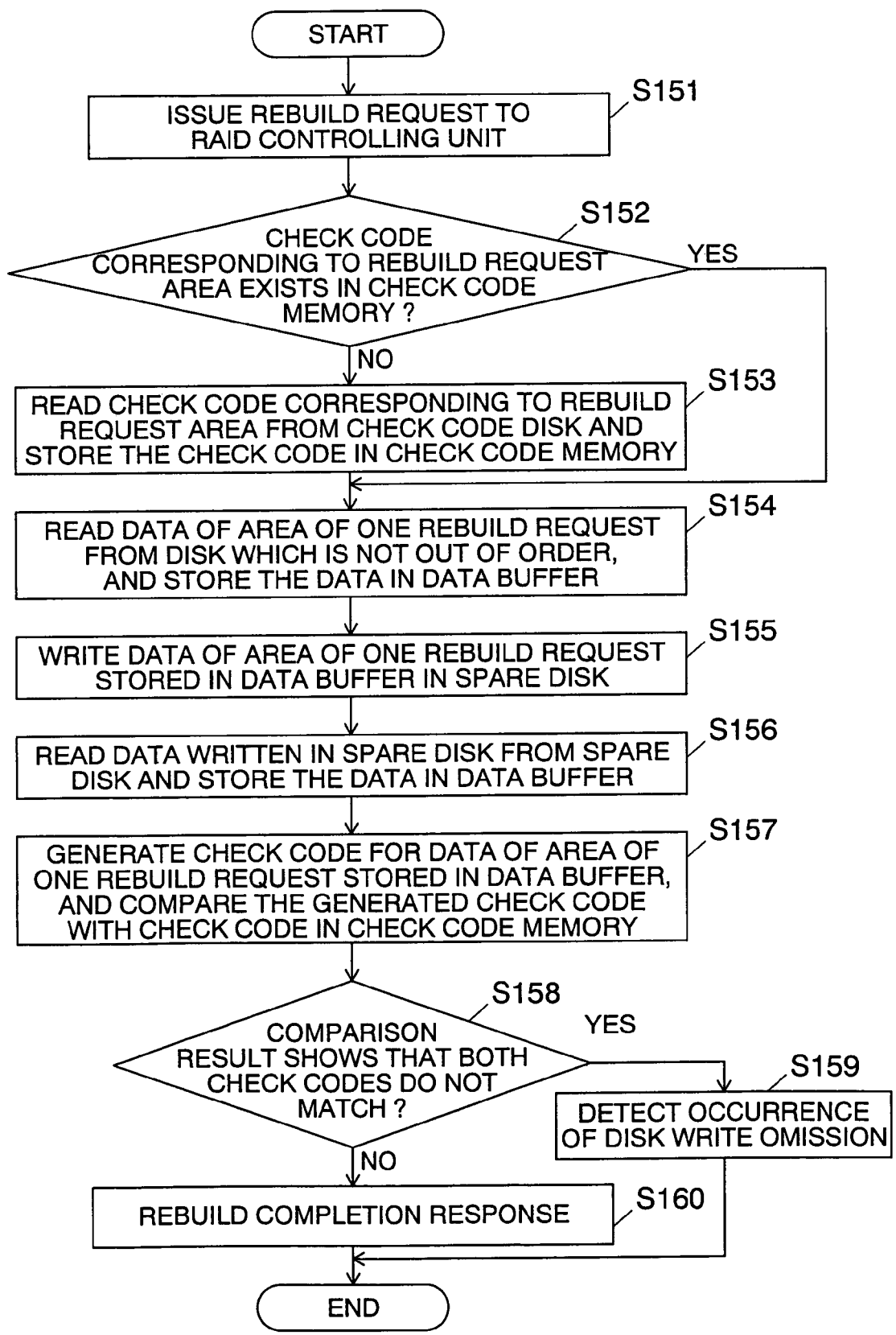
FIG. 40 is a diagram showing an example of a Rebuild processing flow.

Further, FIG. 40 is a diagram showing an example of a Rebuild processing flow in this embodiment.

In this embodiment, the area of one round of Rebuild (reconstruction) processing has a boundary matching that of the check code management unit.

First, a Rebuild request is issued from the Rebuild module 203 in the controller 90 to the RAID controlling unit 102 (step S151).

Next, the RAID controlling unit 102 makes a judgment (Hit/Miss judgment) on whether or not a check code corresponding to a Rebuild request area exists in the check code memory 104 (step S152).

The RAID controlling unit 102 makes the above-described Hit/Miss judgment by, for example, searching the check code page management table storing management information of each check code page 201 in the same manner as in the aforementioned processing when a write-back request is issued.

When a check code corresponding to the Rebuild request area exists in the check code memory 104, processing proceeds to step S154. When a check code corresponding to the Rebuild request area does not exist in the check code memory 104, the RAID controlling unit 102 reads a check code corresponding to the Rebuild request area from the check code disk 105 and stores the check code in the check code memory 104 (step S153).

In this embodiment, the Rebuild request area never exceeds 2 pages of the check code page 201 at a time. Thus, in the above-described processing at step S153, for example, the RAID controlling unit 102 acquires the check code page management table×2 for securing 2 pages of the check code page 201.

The RAID controlling unit 102 reads the check code corresponding to the Rebuild request area from the check code disk 105, and stores the check code in 2 pages of the check code page 201 managed by the acquired check code page management table.

The RAID controlling unit 102 reads data of the area of one Rebuild request from a disk which is not out of order, and stores the data in the data buffer 106 (step S154). For example, the RAID controlling unit 102 reads data of the area of one Rebuild request from the disk 3, and stores the data in the data buffer 106.

Next, the RAID controlling unit 102 writes in the spare disk 202 the data of the area of one Rebuild request stored in the data buffer 106 (step S155).

Next, the RAID controlling unit 102 reads the data written in the spare disk 202 at step S155 from the spare disk 202, and stores the data in the data buffer 106 (step S156).

The RAID controlling unit 102 at step S156 generates a check code for the data of the area of one Rebuild request stored in the data buffer 106, and compares the generated check code with the check code in the check code memory 104 (step S157).

When the comparison result shows that both the check codes do not match (step S158), the RAID controlling unit 102 detects occurrence of a disk write omission (step S159).

When the comparison result shows that both the check codes match, a Rebuild completion response is issued from the RAID controlling unit 102 to the Rebuild module 203 (step S160).

In this connection, the present invention can also be implemented as a program that is read and executed by a computer.

A program implementing the present invention can be stored on an appropriate computer-readable storage medium such as a portable medium memory, a semiconductor memory or a hard disk, and provided by storing the program on these storage media or by transmission and reception through a communications interface utilizing a network.

What is claimed is:

1. An apparatus for detecting write omissions on a disk which stores electronic data as an object for processing in a computer, the apparatus comprising:

a cache memory storing update data as an object of reading and writing by the computer;

a check code generating unit making a plurality of blocks as a set of management data for an object for detection of a write omission on a disk, the update data being set to the plurality of blocks, generating a first check code for each set of management data including a data of write-back request area when writing back the update data stored in the cache memory on the disk, and storing the generated first check code in a storage unit; and a disk write omission detecting unit reading the set of management data including a data of staging request area from the disk when staging data on the cache memory from the disk, storing data of the staging request area of the read set of management data, in the cache memory, generating a second check code from data of the staging request area stored in the cache memory and data other than the data of the staging request area of the read set of management data, comparing the generated second check code with the first check code stored in the storage unit and corresponding to the set of management data including the data of staging request area, and detecting that a write omission on a disk occurred when the first and second check codes do not match.

2. The apparatus according to claim 1, wherein the disk write omission detecting unit reads the set of management data including the data of write-back request area from the disk when writing back the update data on the disk, generates a third check code from the read set of management data, and compares the generated third check code with the first check code stored in the storage unit and corresponding to the set of management data including the data of write-back request area, and wherein, when the third check code and the first check code match as the result of the comparison by the disk write omission detecting unit, the check code generating unit generates a new first check code from the update data of the write-back request area and a data other than the data of the write-back request area, of the set of management data read by the disk write omission detecting unit, and stores the generated new first check code in the storage unit as the first check code corresponding to the set of management data including the data of write-back request area.

3. The apparatus according to claim 1, wherein the check code generating unit generates a check code for parity data corresponding to the set of management data including the data of write-back request area when writing back the update data on the disk, and stores the check code in the storage unit as the first check code, and wherein the disk write omission detecting unit reads the parity data corresponding to the set of management data including the data of write-back request area from the disk when writing back the update data on the disk, generates a fourth check code from the read parity data, compares the generated fourth check code with the first check code stored in the storage unit and generated for the parity data corresponding to the set of management data including the data of write-back request area, and detects that a write omission on a disk occurred when the first and fourth check codes do not match.

* * * * *